(12) United States Patent
Boudaoud et al.

(10) Patent No.: US 7,926,341 B2
(45) Date of Patent: Apr. 19, 2011

(54) SYSTEM AND METHOD FOR SENSING THE LEVEL AND COMPOSITION OF LIQUID IN A FUEL TANK

(75) Inventors: Idir Boudaoud, Besancon (FR); William Stewart, Antrim (IE); Alan McCall, Antrim (IE)

(73) Assignee: Schrader Electronics, Ltd., Antrim (IE)

( * ) Notice: Subject to any disclaimer, the term of this patent is extended or adjusted under 35 U.S.C. 154(b) by 870 days.

(21) Appl. No.: 11/431,912

(22) Filed: May 10, 2006

(65) Prior Publication Data

US 2007/0000321 A1 Jan. 4, 2007

Related U.S. Application Data

(60) Provisional application No. 60/679,562, filed on May 10, 2005.

(51) Int. Cl.
*G01F 17/00* (2006.01)
*G01F 23/00* (2006.01)
(52) U.S. Cl. ............................................. 73/149; 73/291
(58) Field of Classification Search ................ 73/290 R, 73/290 V, 291, 61.43, 61.44, 290 B, 304 C, 73/149, 865
See application file for complete search history.

(56) References Cited

U.S. PATENT DOCUMENTS

| | | | |
|---|---|---|---|
| 2,720,624 A | 10/1955 | Gunst et al. | 324/61 |
| 2,772,393 A | 11/1956 | Davis | 324/40 |
| 3,256,482 A | 6/1966 | Rosso | 324/61 |
| 3,540,275 A | 11/1970 | Post et al. | |
| 4,599,892 A | 7/1986 | Doshi | 73/49 |
| 4,651,105 A | 3/1987 | Inbar | 328/150 |
| 4,729,245 A | 3/1988 | Hansman, Jr. | 73/865 |
| 4,769,593 A | 9/1988 | Reed et al. | 324/61 R |
| 5,088,325 A | 2/1992 | Eichberger et al. | 73/304 |
| 5,150,683 A | 9/1992 | Depa et al. | 123/417 |
| 5,301,542 A | 4/1994 | Meitzler et al. | 73/61.43 |
| 5,414,368 A | 5/1995 | Ogawa et al. | 324/675 |
| 5,440,310 A * | 8/1995 | Schreiner | 342/124 |
| 5,497,753 A | 3/1996 | Kopera | 123/494 |
| 5,832,772 A * | 11/1998 | McEwan | 73/290 R |

(Continued)

OTHER PUBLICATIONS

Notification of Transmittal of the International Search Report and the Written Opinion of the International Searching Authority for PCT/IB2008/003071 Mailed Apr. 15, 2009.

*Primary Examiner* — John Fitzgerald
(74) *Attorney, Agent, or Firm* — J. A. Thurnau, Esq.; T. A. Dougherty, Esq.; P. N. Dunlap, Esq.

(57) ABSTRACT

In a liquid sensing system, an RF signal is applied to a series-resonant circuit. The coil of the resonant circuit is placed proximate to a fuel tank, causing electromagnetic radiation to propagate into the fuel space. The fuel acts as an electrical load to the resonant circuit in a manner proportionate to the volume of fuel in the tank and/or to variations in electrical properties of the fuel itself. The loading effect of the fuel can change the resonant frequency and/or the Q of the resonant circuit. The loading effect of the fuel is determined by monitoring a change in one or more electrical parameters associated with the excited resonant circuit, such as a voltage across the resistor in the resonant circuit. Changes in this voltage are analyzed by a controller, the result of which is used to output a value indicative of level and/or composition of the fuel.

29 Claims, 22 Drawing Sheets

U.S. PATENT DOCUMENTS

| | | | |
|---|---|---|---|
| 6,018,247 A | 1/2000 | Kelly | 324/644 |
| 6,078,280 A * | 6/2000 | Perdue et al. | 342/124 |
| 6,293,142 B1 * | 9/2001 | Pchelnikov et al. | 73/290 R |
| 6,505,509 B2 * | 1/2003 | Gualtieri | 73/290 V |
| 6,564,658 B2 | 5/2003 | Pchelnikov et al. | 73/866 |
| 7,174,783 B2 * | 2/2007 | McSheffrey et al. | 73/291 |
| 7,276,916 B2 | 10/2007 | Hammer | 324/634 |
| 7,319,401 B2 * | 1/2008 | Åkerstrom et al. | 340/612 |
| 7,458,260 B2 * | 12/2008 | Roesner | 73/290 V |
| 2001/0015099 A1 * | 8/2001 | Blaine | 73/290 R |
| 2003/0200801 A1 * | 10/2003 | Lipscomb et al. | 73/290 V |
| 2004/0251919 A1 | 12/2004 | Stahlmann et al. | 324/663 |
| 2006/0103393 A1 | 5/2006 | Stahlmann et al. | 324/658 |
| 2006/0201234 A1 | 9/2006 | Abe et al. | 73/53.01 |

* cited by examiner

| FIG. 4B | FIG. 4D | FIG. 4F | |
|---|---|---|---|
| FIG. 4A | FIG. 4C | FIG. 4E | FIG. 4G |

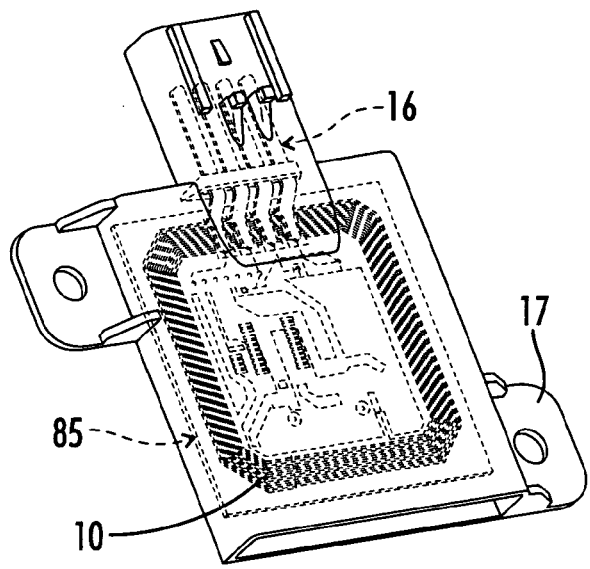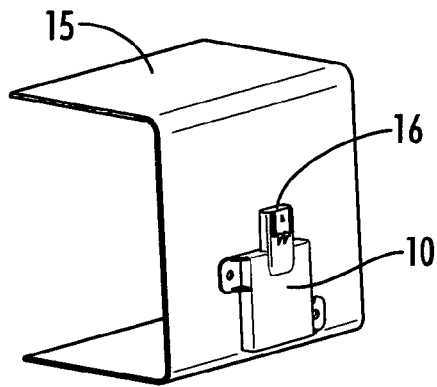
FIG. 10(a)    FIG. 10(b)
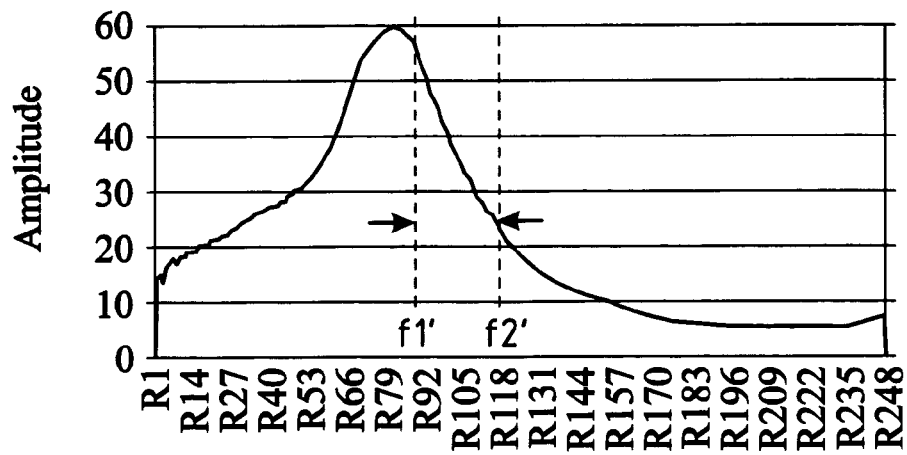
FIG. 11

SYSTEM AND METHOD FOR SENSING THE LEVEL AND COMPOSITION OF LIQUID IN A FUEL TANK

CROSS-REFERENCES TO RELATED APPLICATIONS

This application is a Non-Provisional Utility application which claims benefit of U.S. Patent Application Ser. No. 60/679,562 filed May 10, 2005, entitled "SYSTEM AND METHOD OF FUEL LEVEL SENSING USING EMF SENSING" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to systems and methods for sensing levels and electrical properties of liquids stored in fuel tanks and other containers. More particularly, this invention pertains to sensing liquid levels and properties by propagating electromagnetic waves into a liquid container.

Motor vehicle operators rely on fuel gauges to provide accurate information on the amount of fuel remaining in the fuel tank. The most common method of measuring the amount of fuel remaining in a motor vehicle fuel tank is to place a mechanical float and lever inside the tank. When the fuel level changes in the tank, the float causes the lever to pivot. When the lever pivots in response to changing fuel levels, an electrical signal is proportionately generated and/or varied. This variation in electrical signal is transmitted to a fuel gauge or vehicle data bus external to the tank. Such electromechanical fuel measurement systems are not particularly accurate and, of course, require installation of a mechanism inside the tank. Repair, replacement, or adjustment of an internal fuel level measurement mechanism is problematic.

Engine control systems in many motor vehicles, and particularly in flexible fuel vehicles, also have a need to know the type and/or composition of fuel that is inside the fuel tank. Conventional fuel composition sensors are complex, expensive, and are not capable of also measuring fuel levels.

BRIEF SUMMARY OF THE INVENTION

The present invention provides reliable, inexpensive, and accurate systems and methods for measuring liquid levels and properties in a tank using a mechanism that can be installed external or internal to the tank.

In one embodiment of the liquid level sensing systems and methods of the present invention, a substantially sinusoidal radio frequency (RF) signal of constant frequency is generated and coupled to a series-resonant Inductance, Capacitance, Resistance (LCR) circuit. The coil (inductor) of the resonant circuit is placed in close proximity to, or inside, a plastic fuel tank causing electromagnetic radiation to propagate into the fuel space. Consequently, the liquid fuel inside the tank acts as an electrical load to the series resonant circuit in a manner proportionate to the volume of fuel remaining in the tank. The loading effect of the fuel can cause a shift in the resonant frequency of the circuit and/or a change in the inductance Q of the resonant circuit. The loading effect of the fuel is determined by monitoring a change in one or more electrical parameters associated with the excited resonant circuit. For example, the voltage across the resistor in the series resonant circuit can be monitored. Changes in this voltage are detected and analyzed by a system controller, the result of which is used to output a signal indicative of fuel level. This output can be in the form of a digital or analog electrical signal.

In one embodiment of the invention, the resistive component of the series-resonant LCR circuit is provided by the internal resistance of the inductor rather than by a discrete resistor. In this embodiment, the measurement of changes in voltage in the resonant circuit may be taken across the inductor or a portion thereof.

Depending on the position and orientation of the system coil, and/or the use of ground planes and other RF directional devices, the measured electrical parameter can represent the volume of liquid in the entire container or the volume of liquid in only a portion of the container.

The system and method can sense and measure liquid levels in other containers including oil tanks and water tanks and is not limited to the examples used in this description. The system can be used in a wide variety of scientific, consumer, industrial, and medical environments.

Preferably, the system includes auto-calibration hardware and software that enables the system to automatically determine an optimum system operating frequency. In one embodiment of the system, the optimum system operating frequency is selected to be a frequency above or below the resonant frequency of the series LCR circuit. The choice of this operating frequency over the resonant frequency allows for larger changes in voltage drop relative to changes in liquid volume. Preferably, the system is tuned to operate at a frequency between a lower and upper value.

In one embodiment, auto-compensation is provided so that the measured electrical parameter provides an accurate indication of the liquid level in the tank, independent of variations in operating conditions, such as ambient temperature. In another embodiment, the system can measure—and be calibrated for—variations in the electrical properties of the liquid itself.

The system can include a physical or wireless data interface to facilitate external transmission of the compensated measurement from the system to a fuel gauge or to a central controller in the vehicle. In some embodiments, the system may transmit raw data to a receiver connected to a central controller, with compensation of the raw data being performed in the central controller. The data can be transmitted periodically, in response to a change, by request from the central controller, or by request from an external device such as a diagnostic device.

BRIEF DESCRIPTION OF THE SEVERAL VIEWS OF THE DRAWINGS

FIGS. 9(b) and 9(c) together show the mounting of the system board in a second position with respect to the fuel tank of FIG. 6.

FIG. 10(a) is a perspective view of another embodiment of the system board of the present invention.

FIG. 10(b) is a perspective view of the system board of FIG. 10(a) mounted to a fuel tank.

FIG. 11 is graphical representation of the frequency response of the series resonant output circuit of the system after initial frequency calibration.

DETAILED DESCRIPTION OF THE INVENTION

Figure 2:
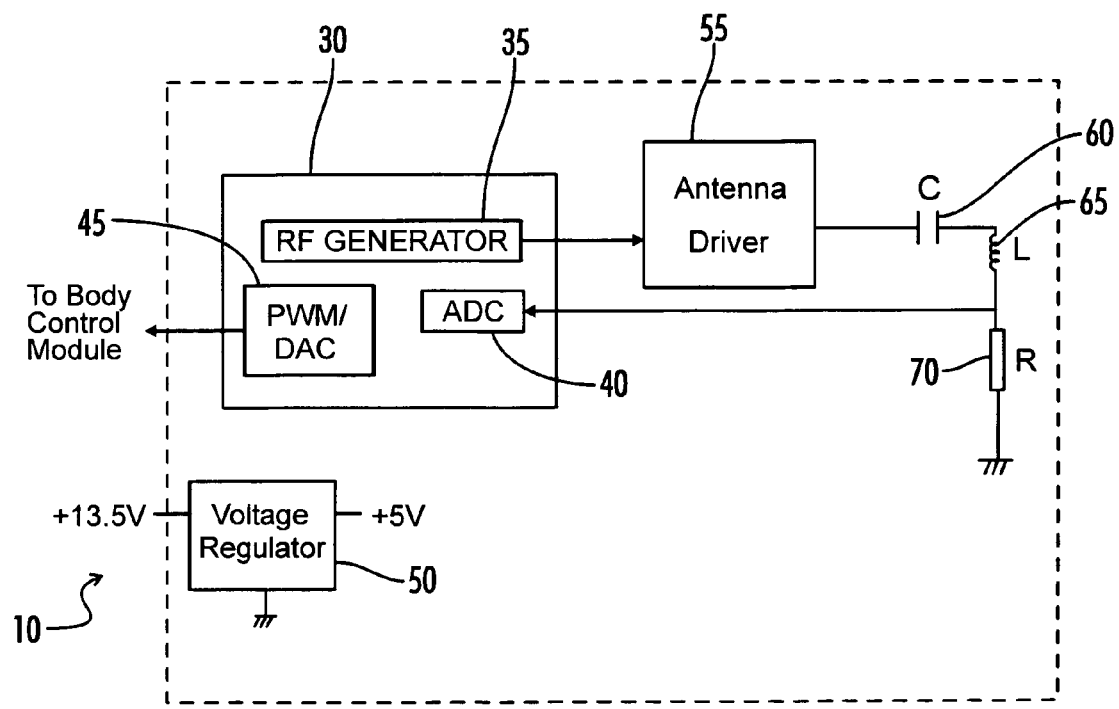
FIG. 2 is block diagram of one embodiment of the liquid sensing system of the present invention.

A block diagram of the liquid measurement system 10 of this invention is shown in FIG. 2. A controller 30, which can be a microcontroller, an application specific integrated circuit (ASIC), or another logical device, includes an RF generator 35, an analog-to-digital converter (ADC) 40 and a pulse width modulator (PWM) or digital-to-analog converter (DAC) 45. The controller 30 further includes embedded firmware/software functional to control the RF generator 35, to receive and process data from ADC 40, and to cause PWM/DAC 45 to transmit data external to the system 10. The firmware/software in controller 30 also includes modules that implement the auto-calibration and compensation algorithms as described below.

Still looking at FIG. 2, the output of RF generator 35 is transmitted to antenna driver 55 which can include an RF amplifier and/or matching circuitry to effectively couple the RF signal to a series-resonant circuit that includes a resonant capacitor 60, resonant inductor or coil 65, and resistor 70. One terminal of resistor 70 is electrically connected to system ground. The other terminal of resistor 70 is electrically connected to an analog input on ADC 40. Thus, in accordance with one aspect of the invention, changes in voltage across resistor 70 are converted to digital signals by ADC 40 so that such digital signals can be further processed by controller 30. Thus, the controller 30 converts the signal representing a change in the electrical parameter of the resonant circuit into a liquid level signal that is provided to the vehicle fuel gauge directly or through a vehicle data bus.

In the embodiment shown in FIG. 2, the series resonant circuit can be characterized as an antenna circuit in which resonant inductor 65 functions as a radiating component that directs RF energy into the fuel tank 15. In other embodiments, a separate radiating component (not shown) may be coupled to the resonant circuit. Also, in the embodiment of FIG. 2, the resistive component R of the series-resonant LCR circuit is illustrated as a discrete resistor 70. However, the resistive component R can also be provided as an internal resistance of the resonant inductor or coil 65 rather than as a separate discrete component. In such an embodiment, changes in voltage are measured across the resonant inductor 65 or a portion thereof.

Figure 3:
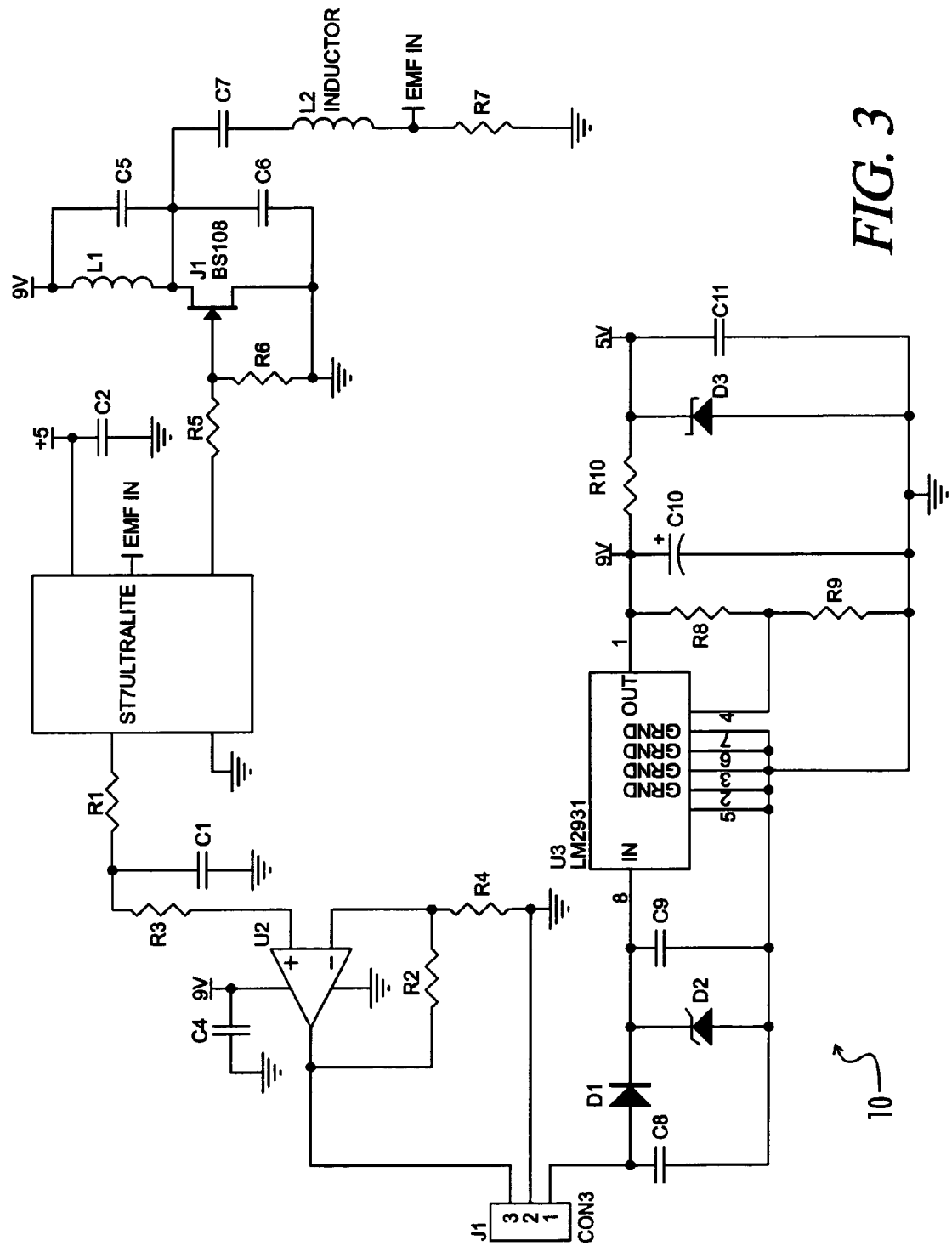
FIG. 3 is an electrical schematic drawing of one embodiment of the liquid sensing system of the present invention.
Figures 4, 4A:
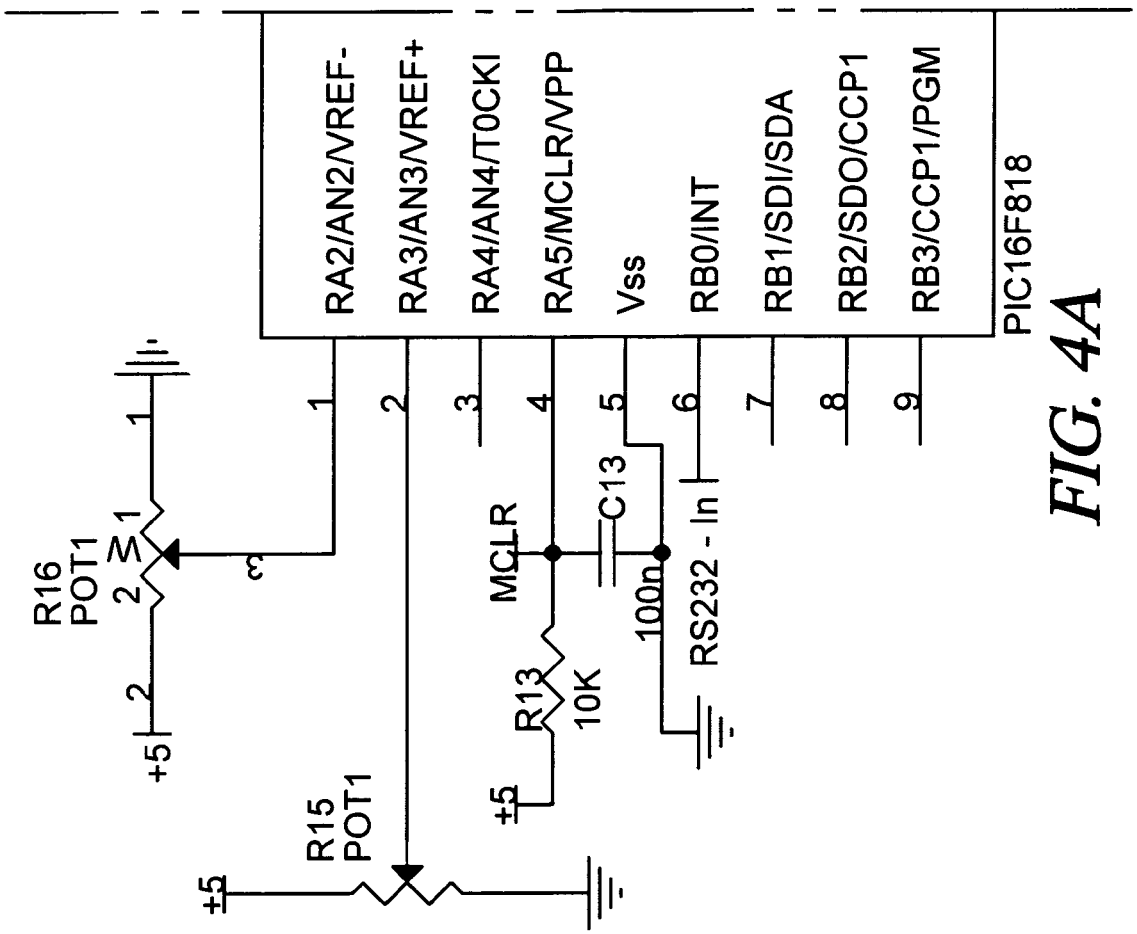
FIG. 4 is an electrical schematic drawing of a second embodiment of the liquid sensing system of the present invention.
Figure 4B:
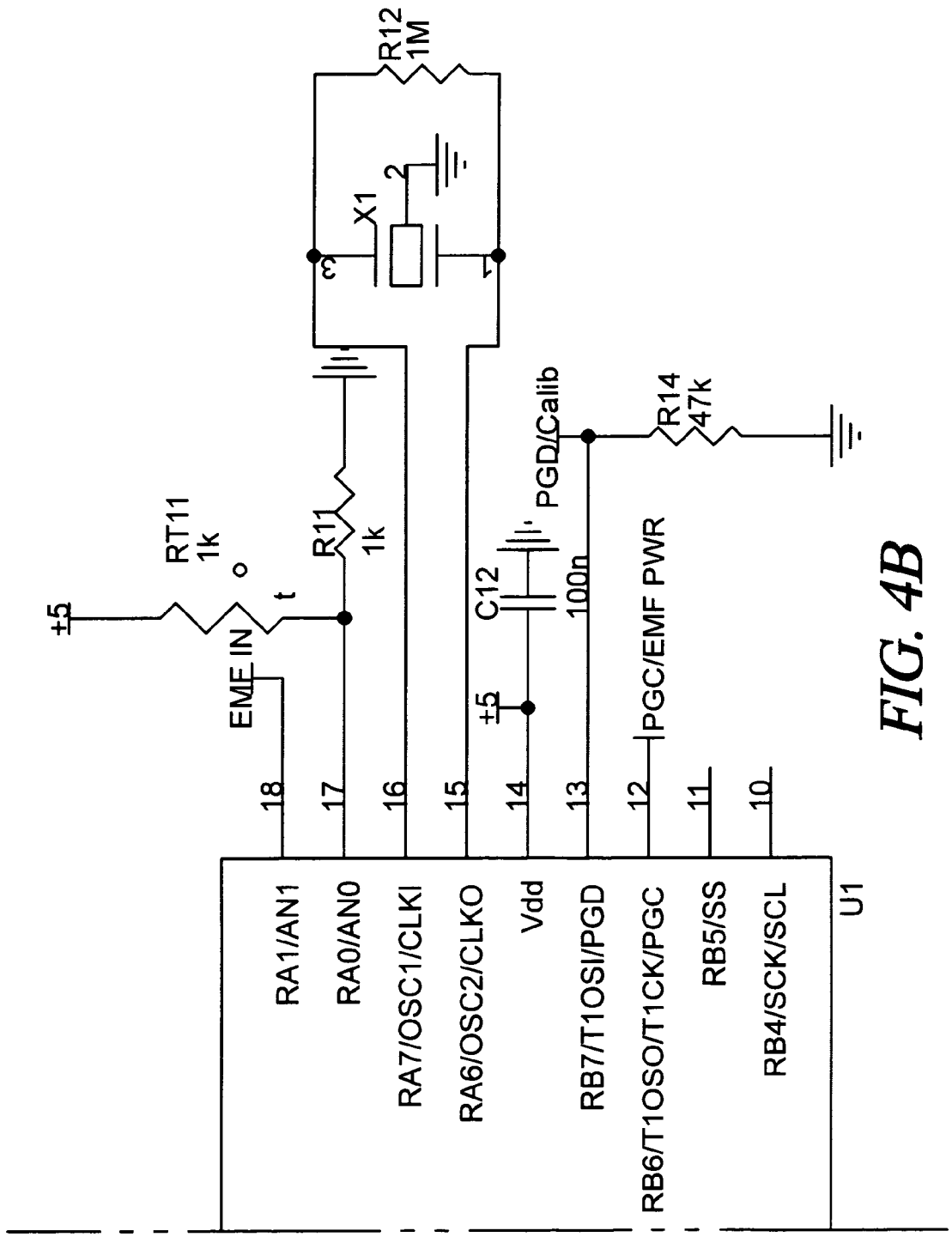
Figure 4C:
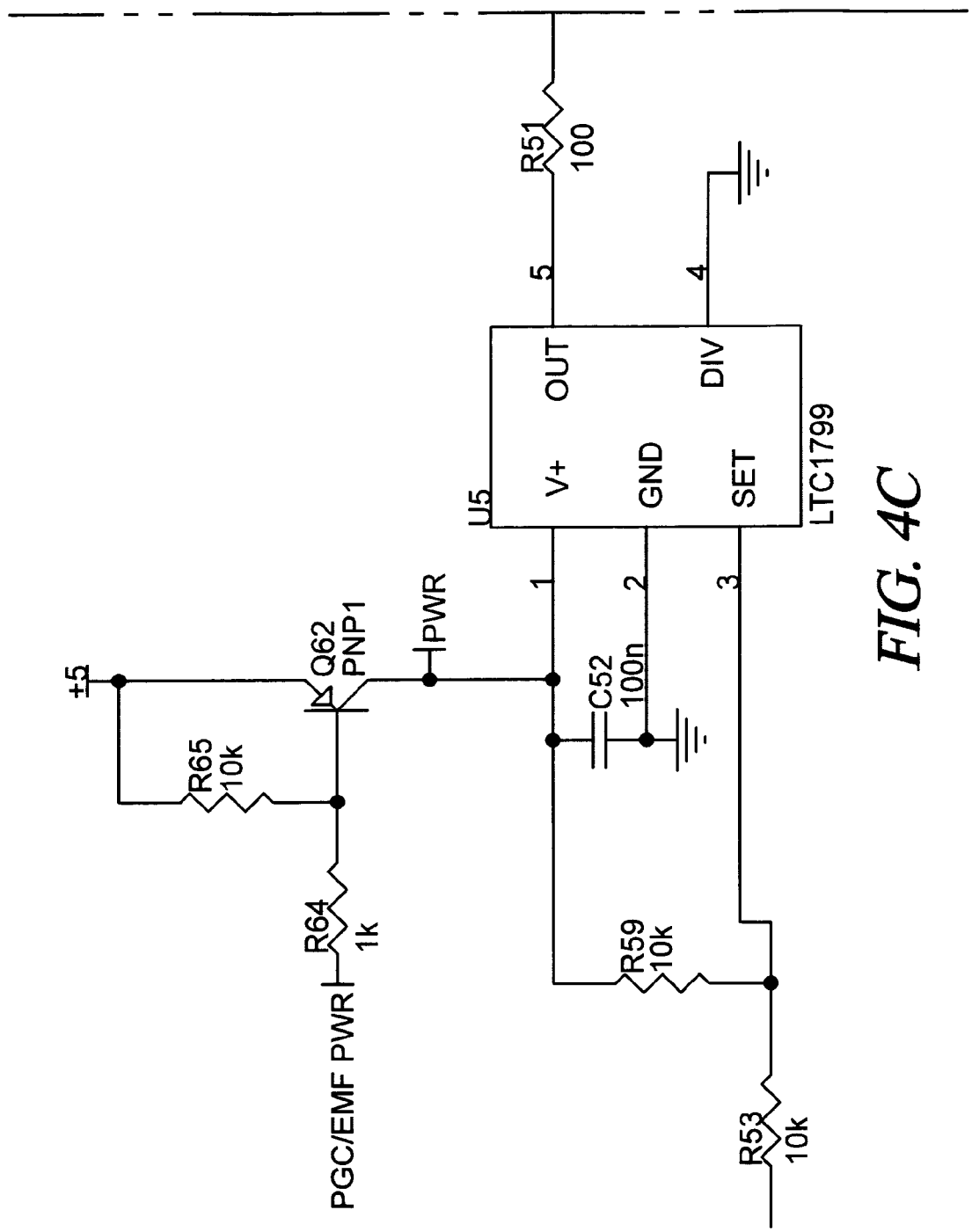
Figure 4D:
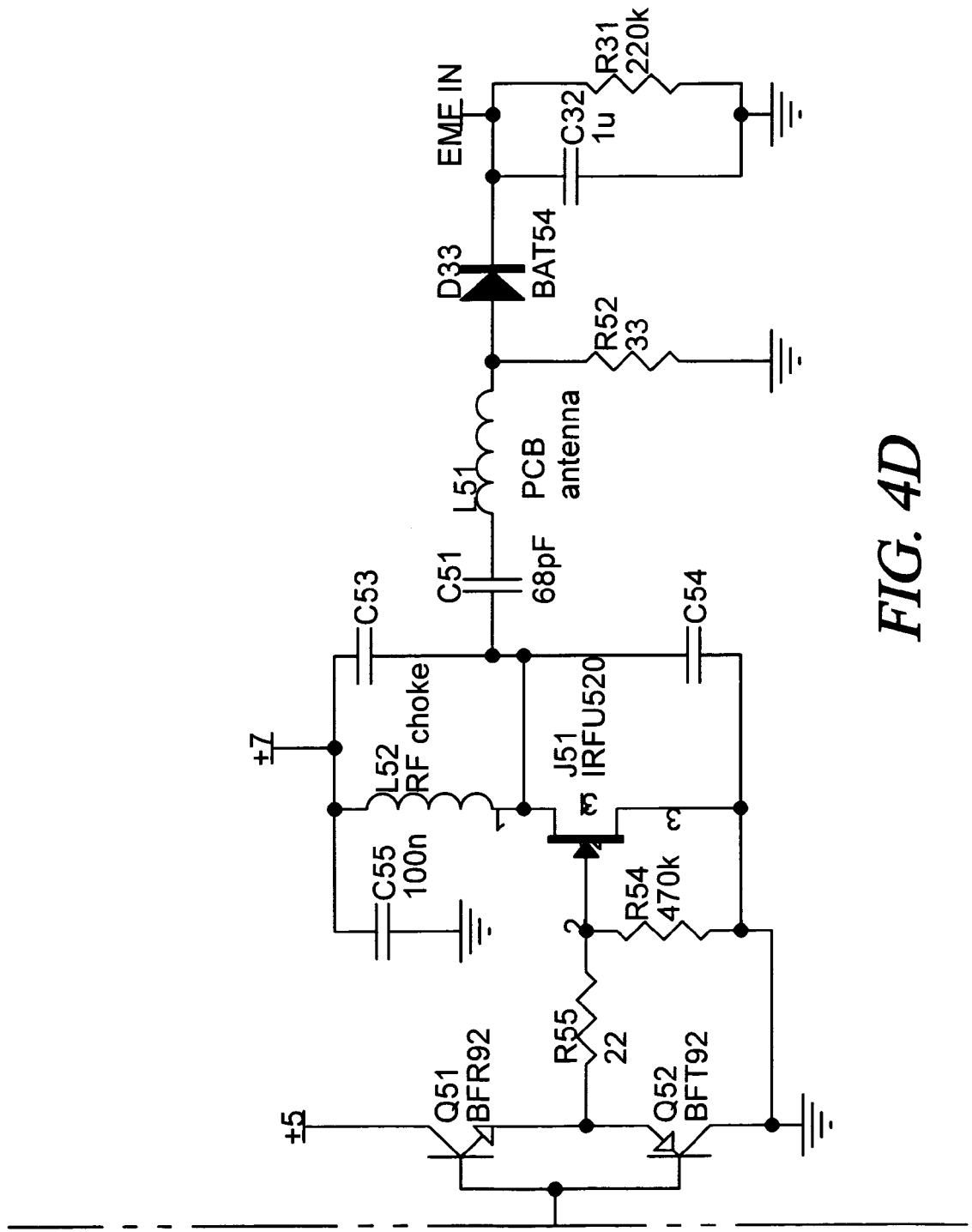
Figure 4E:
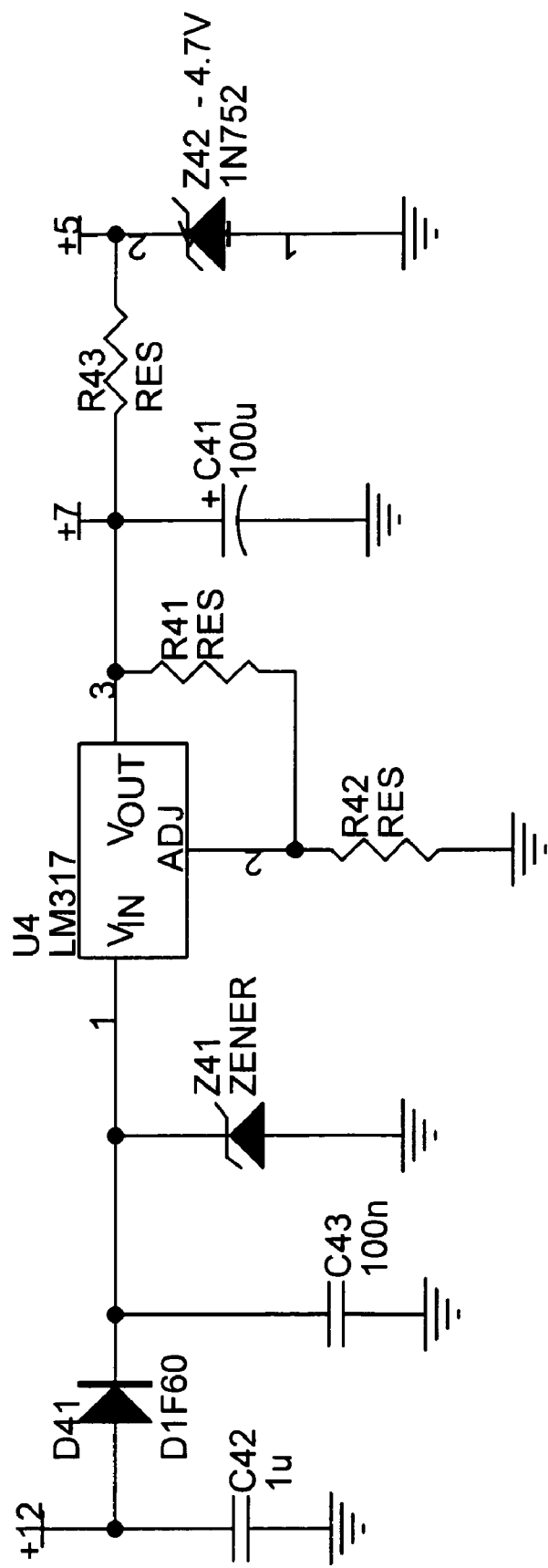
Figure 4F:
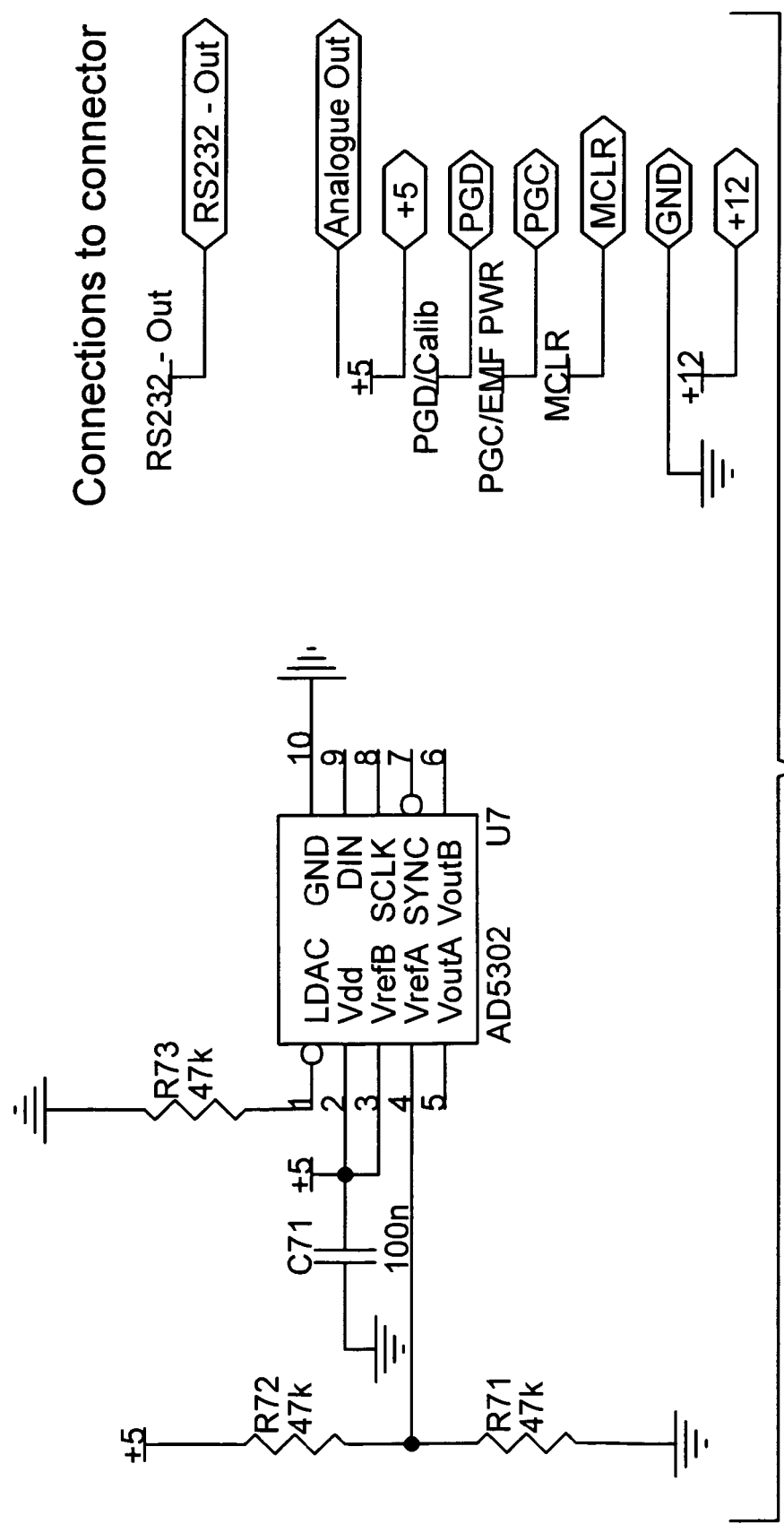
Figure 4G:
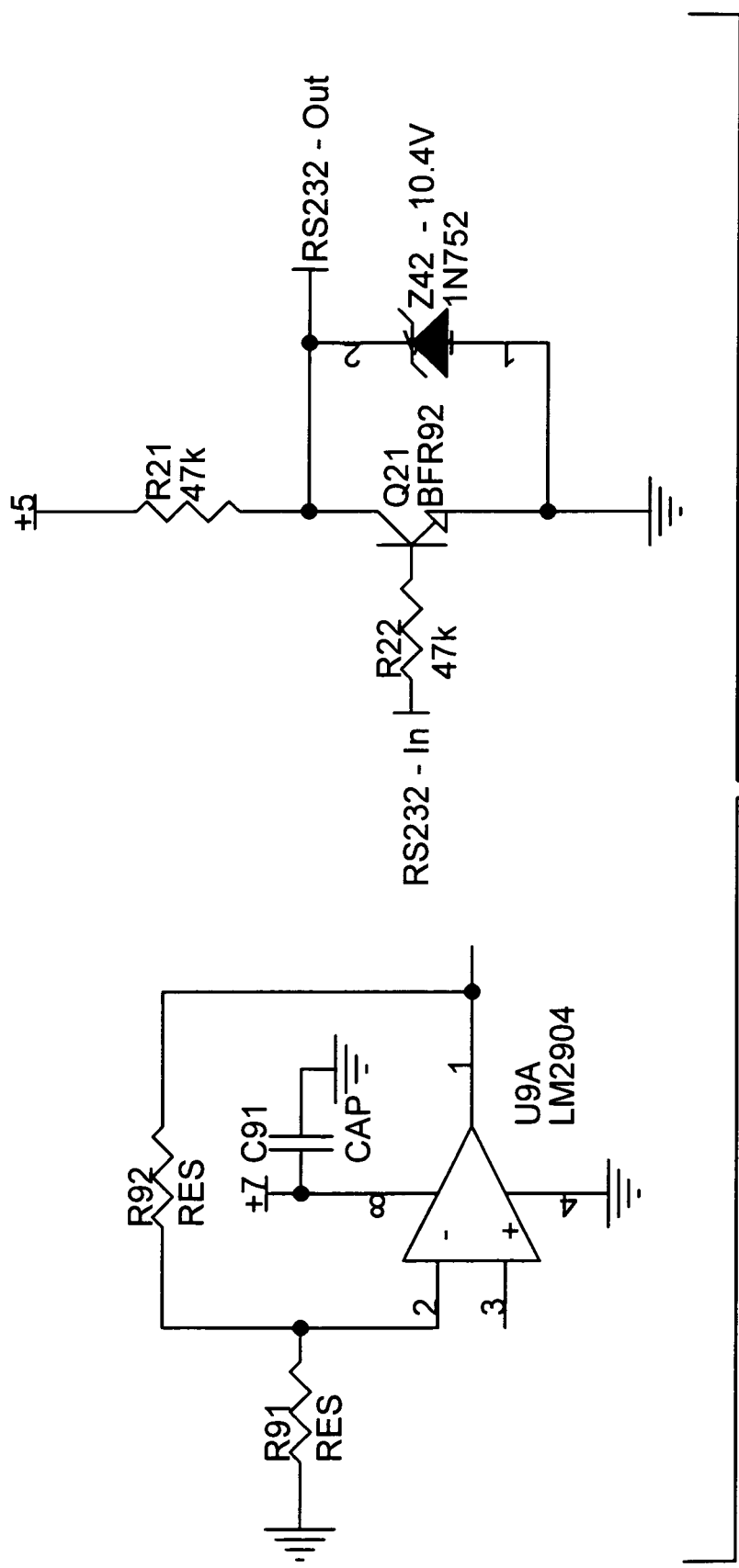

Although the scope of the present invention is not limited to any particular circuit topology, FIG. 3 is a schematic diagram of one embodiment of the system 10 shown in block diagram form in FIG. 2. FIG. 4 is a schematic diagram of another embodiment of the system, as used in testing described below.

Figure 1:
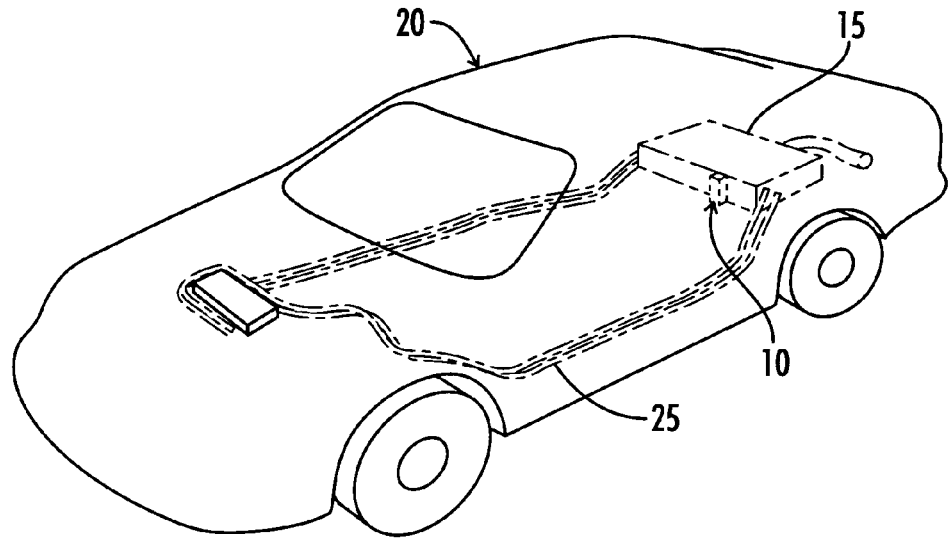
FIG. 1 is a perspective view of a motor vehicle with fuel system components shown in phantom.
Figure 6:
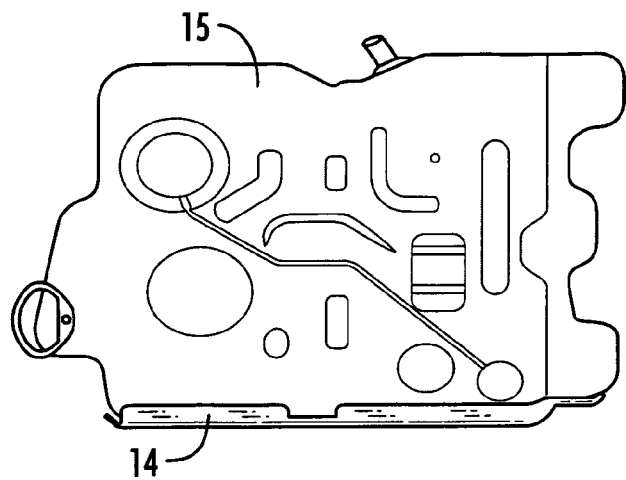
FIG. 6 is a top view of a vehicle fuel tank in which fuel levels are measured using the system of the present invention.
Figure 7:
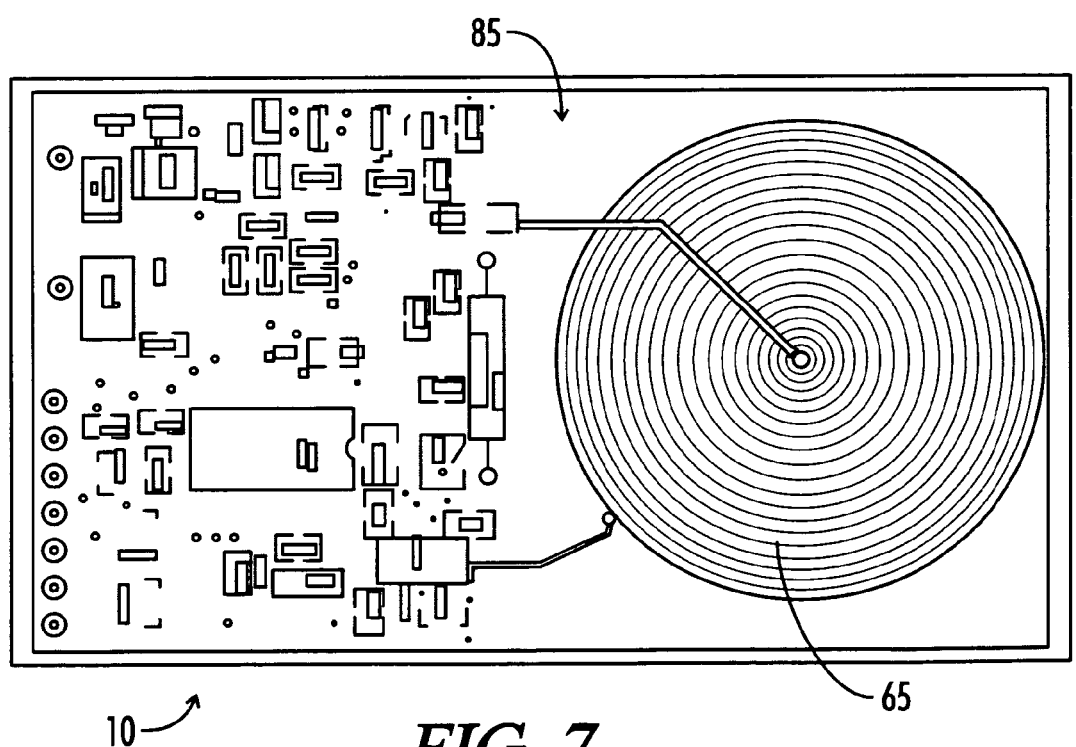
FIG. 7 is a plan view of one embodiment of a printed circuit board (system board) to which the electronic components of the system are mounted and interconnected.

Preferably, the electronic components of the system 10 are mounted to a system board, such as a unitary printed circuit board (PCB) 85, as shown in FIG. 7, with the coil 65 having a geometry, orientation, and position on the PCB 85 to provide optimum RF energy coupling external to the PCB 85. The printed circuit board 85 can be rigid or flexible, with or without an adhesive back. FIG. 6 shows one embodiment of a plastic vehicle fuel tank 15 which is conventionally mounted in the rear of a vehicle 20, as shown in FIG. 1. The fuel tank 15 is fluidly coupled to the vehicle engine and emission systems via one or more fluid lines 25.

Figure 9A:
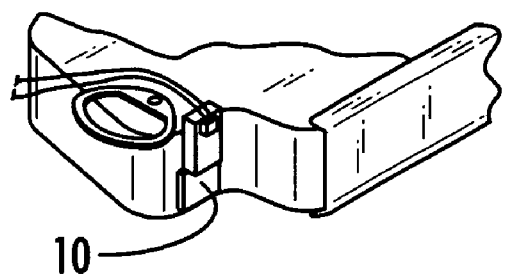
FIGS. 9(a) and 9(c) together show the mounting of the system board in a first position with respect to the fuel tank of FIG. 6.
Figure 9B:
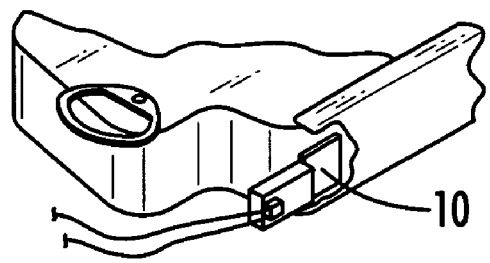
Figure 9C:
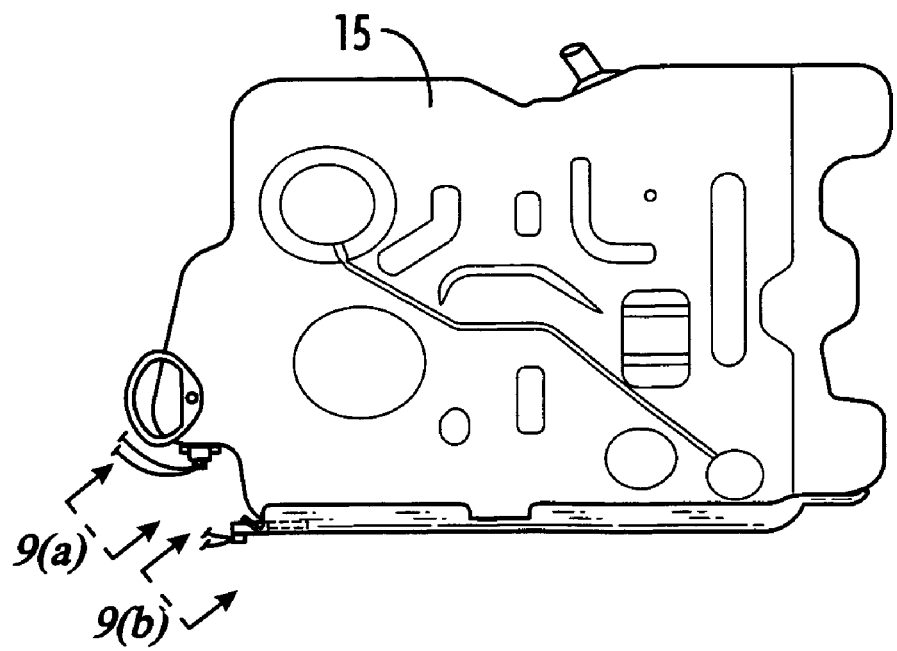

As best seen in FIGS. 9(a)-(c), the PCB 85 is attached to an external wall of fuel tank 15 in a position that will provide sensing of changes in the desired liquid level, either in the entire tank 15 or in only a portion of the tank 15.

Figure 5:
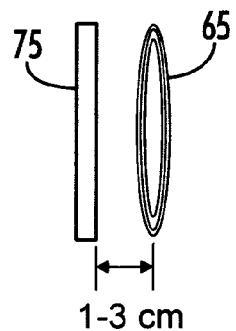
FIG. 5 is an enlarged side view of an antenna coil as used in the present invention further showing its position in relation to a ground plane element.
Figure 8A:
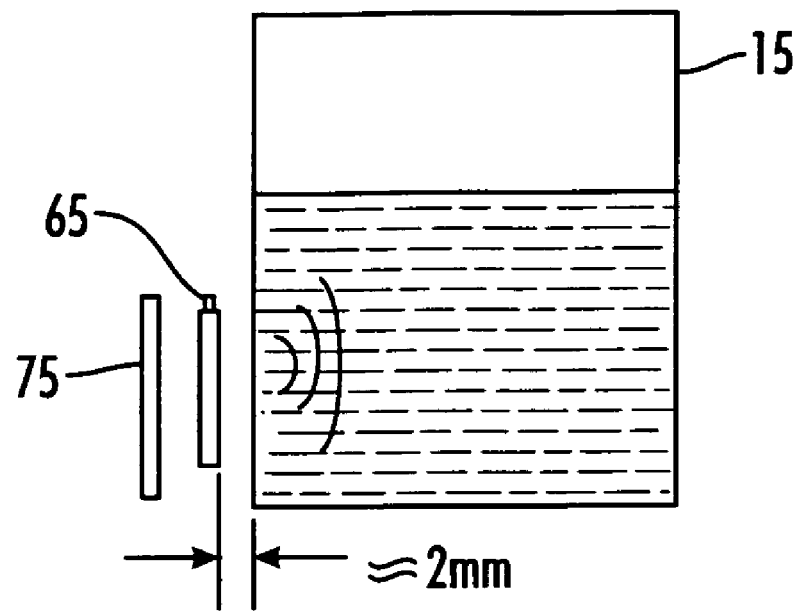
FIG. 8(a) is a side view schematically illustrating the physical relationship between a liquid tank, externally positioned antenna coil, and ground plane as used in one illustrated embodiment the present invention.

In some embodiments of the system 10, a ground plane structure 75 is positioned proximate to and behind the coil 65 so as to focus and direct RF energy from the coil 65 into the tank 15, as shown in FIGS. 5 and 8. In the embodiment of FIG.

8(a), the ground plane 75 is spaced approximately 2 mm from the coil 65, although other embodiments may use different spacings, as shown in FIG. 5, for example. Where a heat shield 14 is used with the fuel tank 15 (as shown on FIG. 6), the heat shield can optionally be used as the ground plane structure 75 as a further cost saving measure.

The coil 65 can be attached or incorporated into strap (not shown) that secures the fuel tank 15 to the vehicle. This would avoid the expense of modifying a conventional fuel tank to accept a direct-mounted coil 65 or PCB 85. In addition, if the tank mounting strap is grounded to the vehicle, the strap itself can function as ground plane structure 75, further reducing cost.

Figure 8B:
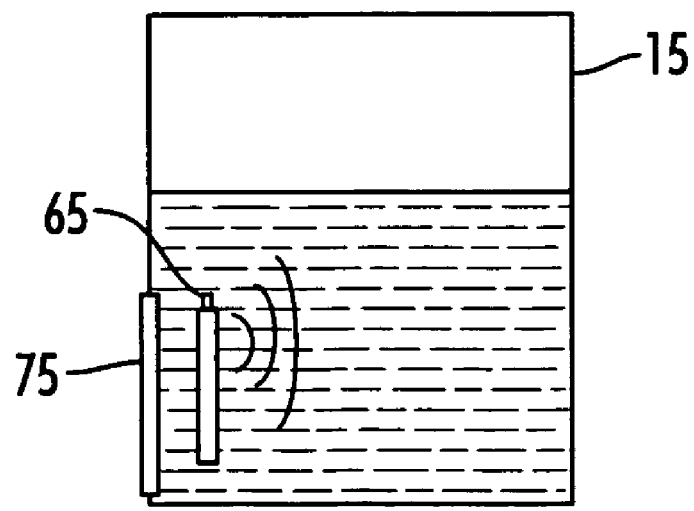
FIG. 8(b) is a side view schematically illustrating the physical relationship between a liquid tank, internally positioned antenna coil, and ground plane as used in one illustrated embodiment of the present invention.

In yet another embodiment of the system 10 as shown in FIG. 8(b), the series-resonant LCR circuit, or at least the coil 65, can be mounted inside the fuel tank 15. If a ground plane 75 is used, it can also be positioned inside the tank 15, between the coil 65 and the tank wall.

Another embodiment of the PCB 85 and fuel tank mounting is shown in FIG. 10. In this embodiment, the PCB 85 is attached to a mounting plate 17 which can also act as a heat sink. The mounting plate 17 is then attached a wall of the fuel tank 15. The PCB 85 further includes a connector 16 that electrically connects the system 10 to the vehicle electrical system and to the vehicle data bus for purposes of transmitting a fuel level signal. The fuel level signal can be transmitted using a physical (hard-wired) connection or using a wireless connection.

When the PCB 85 and coil 65 are positioned proximate to or inside the tank 15 as shown, liquid in the tank 15 will electrically load the series-resonant circuit formed by capacitor 60, coil 65, and resistor 70. Accordingly, when the controller 30 activates the RF generator 35, the coil 65 is excited by a substantially sinusoidal RF signal at a constant frequency. The loading caused by fuel proximate the coil 65 will either reduce the Q of the resonant circuit and/or change its resonant frequency. In either case, the voltage measured across the resistor 70 (or across the internal resistance of the coil 65) will vary by an amount that is proportional to a change in fuel level, due to a corresponding change in impedance of the coil 65. This change in voltage is converted to a digital signal in the ADC 40 and processed by the controller 30 so that a corresponding data output from the PWM/DAC 45 can be transmitted to a fuel gauge or vehicle central controller (not shown.)

Other embodiments of the system 10 can use a parallel resonant circuit with other means of measuring a parameter that represents a change in loading of the resonant circuit caused by changes in fuel level in the tank.

Preferably, the operating frequency of the RF generator 35 is adjusted so that it is slightly above the resonant frequency of the series-resonant LCR circuit. As shown on FIG. 11, the system operating frequency is selected to define a liquid level sensing window on a relatively steep portion of the frequency response curve, thereby providing maximum sensitivity to changes in liquid level. When the printed circuit board 85 and coil 65 are placed on a fuel tank 15, the series resonant circuit will have a different resonant frequency that varies from tank to tank due to component tolerances, tolerance on tank dimensions, coil dimensions, track width, etc. In order to compensate for these variations, an auto-calibration method is preferably used. In one embodiment of such a method, the controller 30 includes a calibration module that finds the resonant frequency (fc) of the series-resonant circuit after first power up (or on request), then adjusts the operating frequency of the RF generator 35 to a frequency (f1) so that the system is operating on the linear slope throughout the entire operating temperature range (−40 to +80 C).

Figure 17:
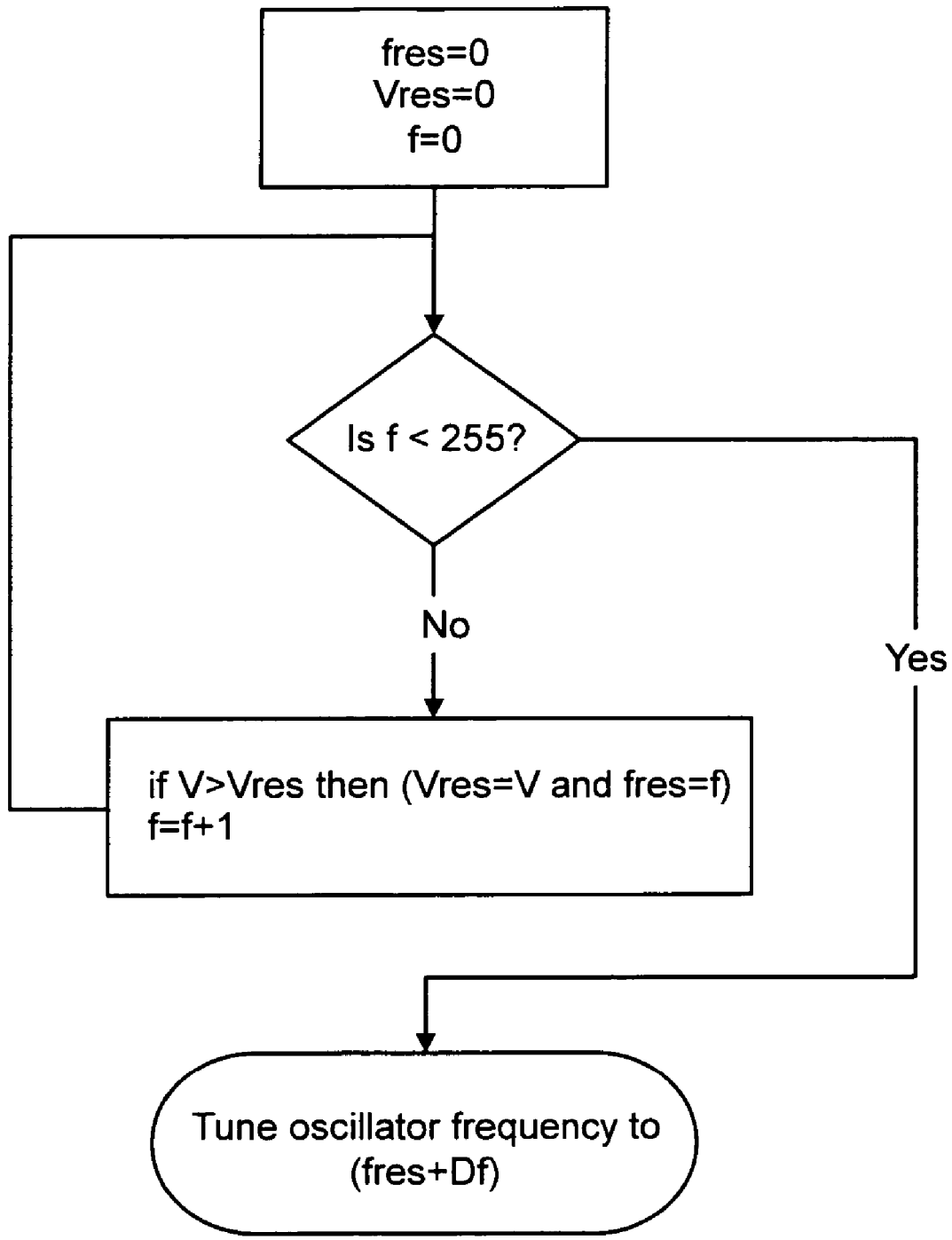
FIG. 17 is a flow chart illustrating the steps associated with auto-calibration of the RF signal generator at system initialization.

Referring to the flow chart in FIG. 17, the controller 30 varies the frequency f of the RF generator 35 in steps from 0 to 255, where 0 corresponds to the lowest frequency (6.34 MHz) and 255 corresponds to the highest frequency (9.66 MHz). However, use of the system is not restricted to these frequencies. In one embodiment, the lowest frequency is 7.4 MHZ and the highest frequency is 8.3 MHz. For each frequency, the controller 30 samples the data from ADC 40 and reads V, the voltage across resistor 70. The controller 30 varies the operating frequency f (sweeping the frequency from low to high or from high to low) in order to find the resonant frequency of the series-resonant circuit. The controller 30 then adjusts and fixes the frequency f1 to a point in a substantially linear section of the frequency response curve. The variation from full to empty tank should be in the substantially linear zone (f1 to f2) as shown on FIG. 11. Once the nominal operating frequency of the system 10 is selected, it can remain fixed for as long as the system 10 remains in the vehicle.

Figure 15:
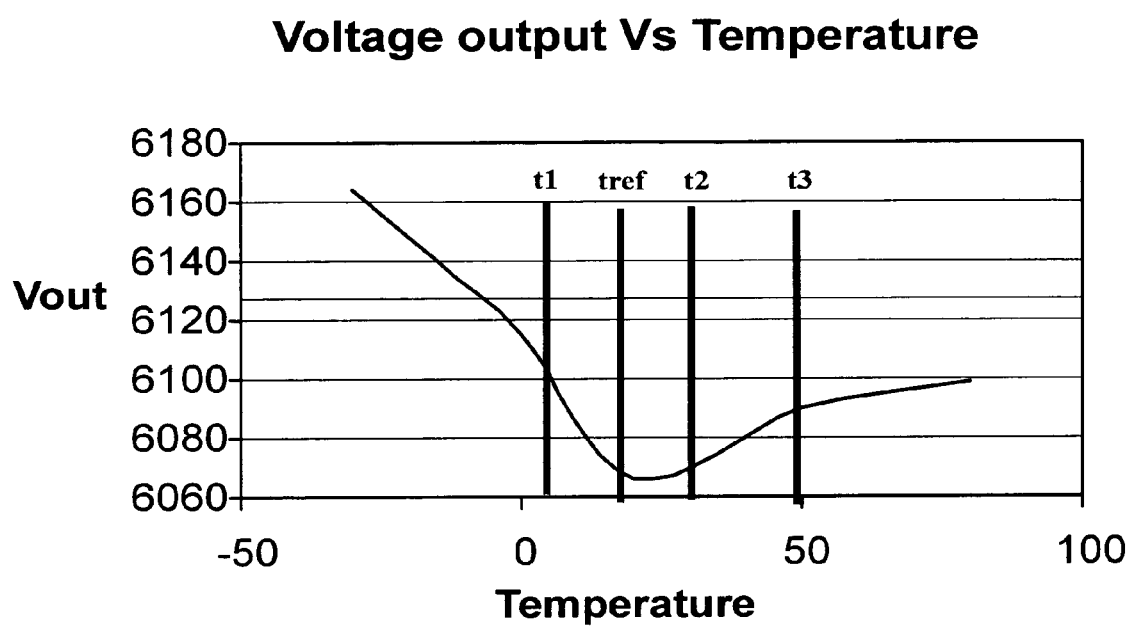
FIG. 15 is a graphical plot of system response as ambient temperature is varying through the entire operating temperature range.
Figure 16:
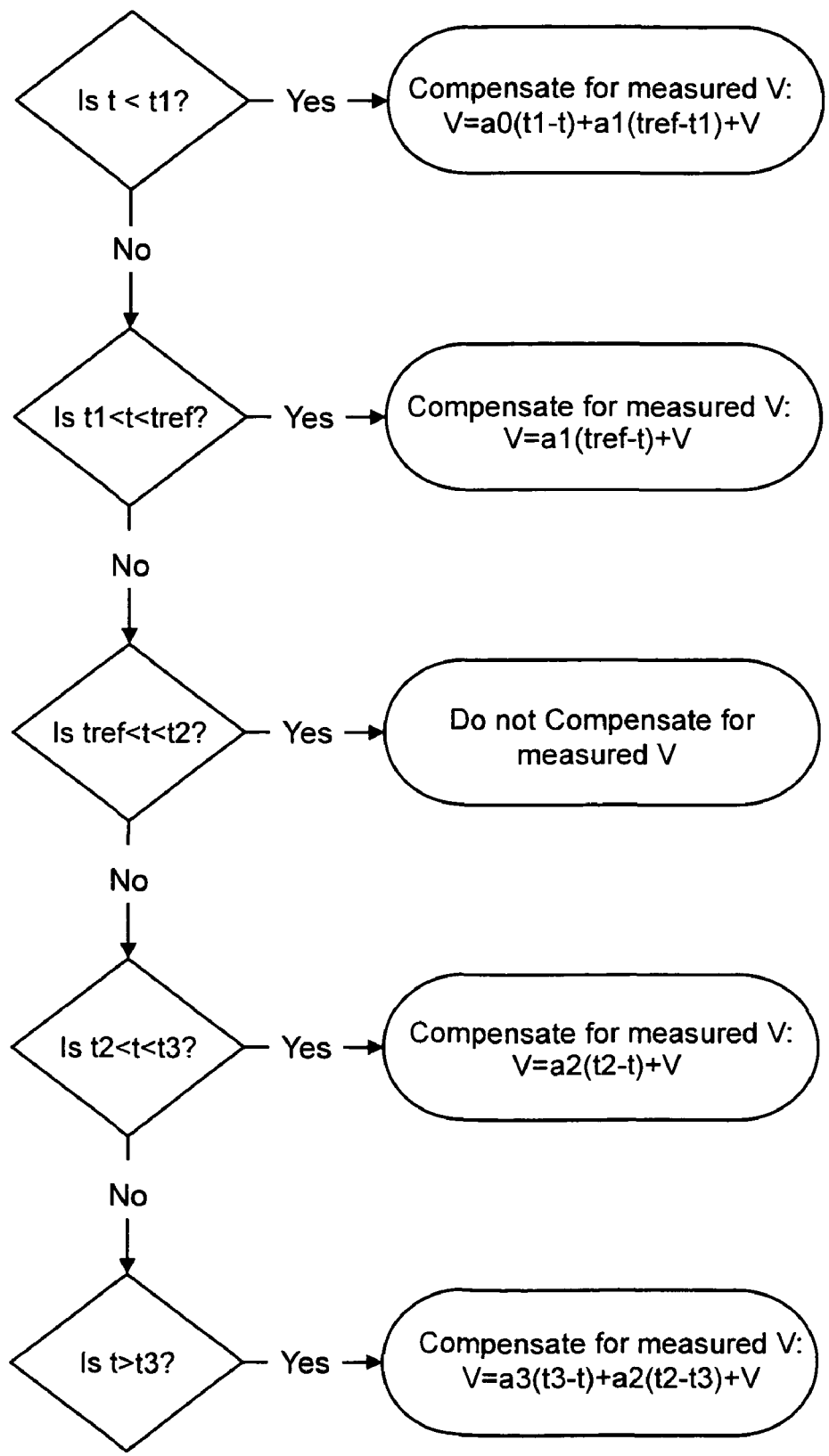
FIG. 16 is a flow chart illustrating the steps associated with the temperature compensation algorithm used in one embodiment of the system.

Electronic components and systems in motor vehicles will preferably operate properly over a wide range of ambient temperatures. Changes in temperature can induce system output errors. This is shown with raw system data from the ADC 40 graphed in FIG. 12(a) and linearized in FIG. 12(b). In order to compensate for the effects of temperature, the system output is characterized over the entire range of operating temperatures (−40 to +80 C) at Empty and Full tank. FIG. 15 shows system voltage output as a function of temperature through a full temperature range. As an approximation, the graph is divided into sections, where each section is linear following the equations below:

If $t<t1$: $V=a0T+b0$

If $t1<t<tref$: $V=a1T+b1$

If $tref<t<t2$: $V=cst$

If $t2<t<t3$: $V=a2T+b2$

If $t>t3$: $V=a3T+b3$

One embodiment of the system 10, as shown in FIG. 4, was installed in a test vehicle similar to that shown in FIG. 1. The system coil 65 was wound and configured as follows:

Number of turns=35
Physical Size=50×50 mm, Spiral
Track width=0.15 mm
Distance between tracks=0.4 mm (center to center)

The series-resonant circuit included the following component values:

L=68 uH
R=33 ohms
C=10 pF

The ground plane was configured to be 50×50 mm and positioned a few centimeters away from coil 65, as shown in FIG. 8. The fuel tank 15 had the following dimensions: w=950 mm, l=670 mm, h=210 mm, with a fuel capacity of approximately 80 liters. Note that if the resistance in the series-resonant LCR circuit is provided by the internal resistance of the coil rather than by a discrete resistor, the actual resistance will likely be lower, on the order of 20 ohms or less.

In a first test, the effects of temperature on system output were measured as follows: The vehicle was driven for 10 minutes then stopped for 20 minutes in order to obtain a fuel level signal (at ADC 40) at different temperatures. This test was repeated at three different fuel levels (full, ¾ and empty).

Figure 12A:
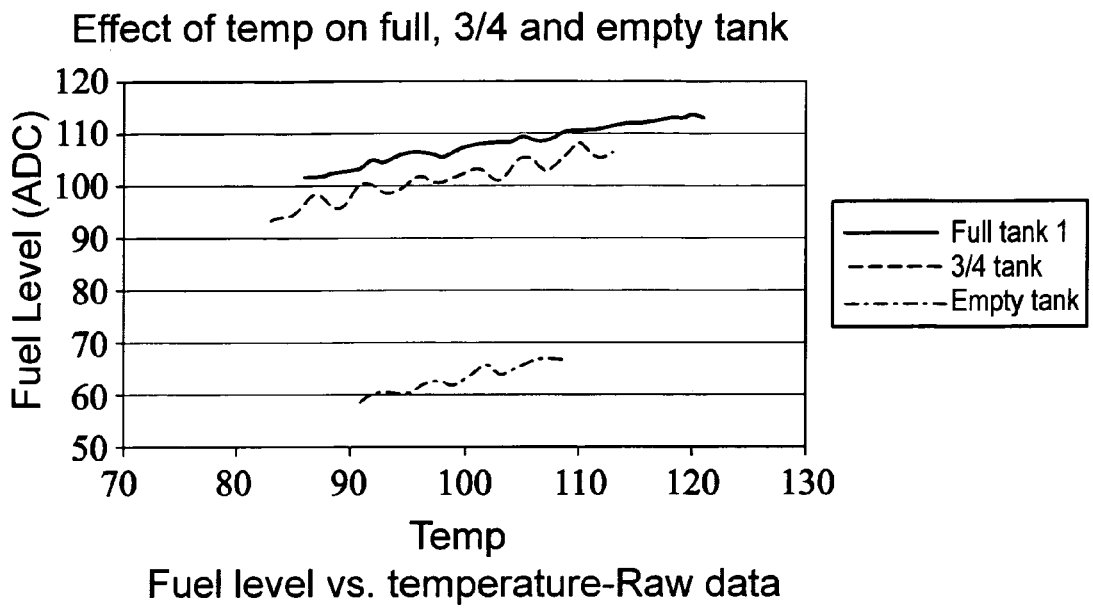
FIG. 12(a) is graphical plot showing the effects of temperature on system fuel level readings before temperature compensation.
Figure 12B:
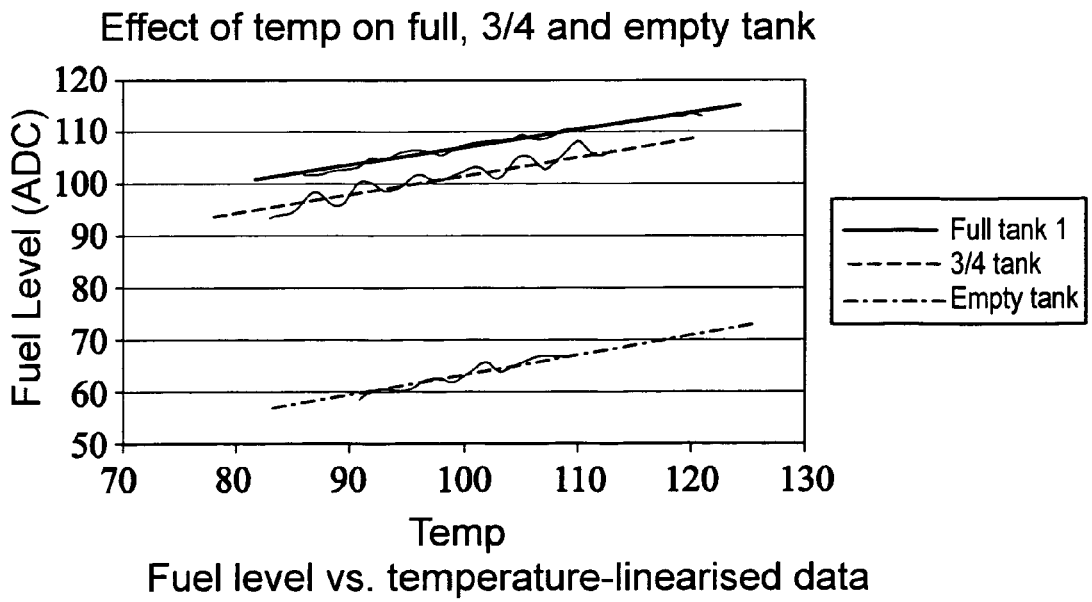
FIG. 12(b) is graphical plot showing a linearization of the effects of temperature on system fuel level readings.

The test results are shown on the graph in FIG. 12(a). As can be seen, the ADC 40 output vs. temperature varies according to a pattern (oscillating around a line) at all liquid levels. Therefore, to compensate for the temperature, as a first approximation, a simple linearization algorithm was implemented as shown in FIG. 12(b).

Figure 13:
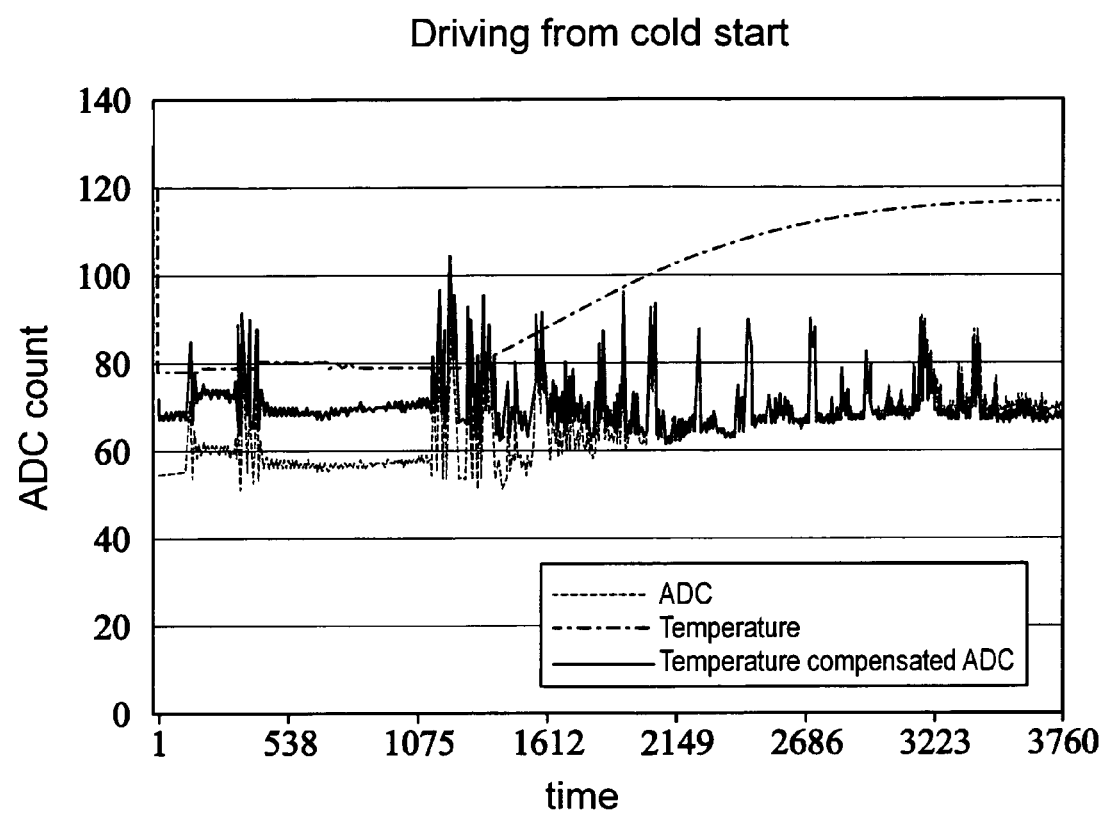
FIG. 13 is graphical plot showing the effects of temperature on system fuel level readings, with and without temperature compensation, using a linearized temperature compensation algorithm in accordance with FIG. 12(b).

After the temperature compensation algorithm was programmed into the system controller 30, the vehicle was driven for 20 minutes starting from cold (outside temperature=−7 C) with an empty tank. The temperature, fuel level, and temperature compensated fuel level signals were recorded as displayed in the graph shown in FIG. 13. The compensated fuel level ADC 40 output remains stable around 65 counts (corresponding to an empty tank) when the temperature and the measured fuel level varies. Thus, the temperature compensation algorithm compensates for the changes due to temperature so that the fuel gauge always shows the actual empty level.

Figure 14A:
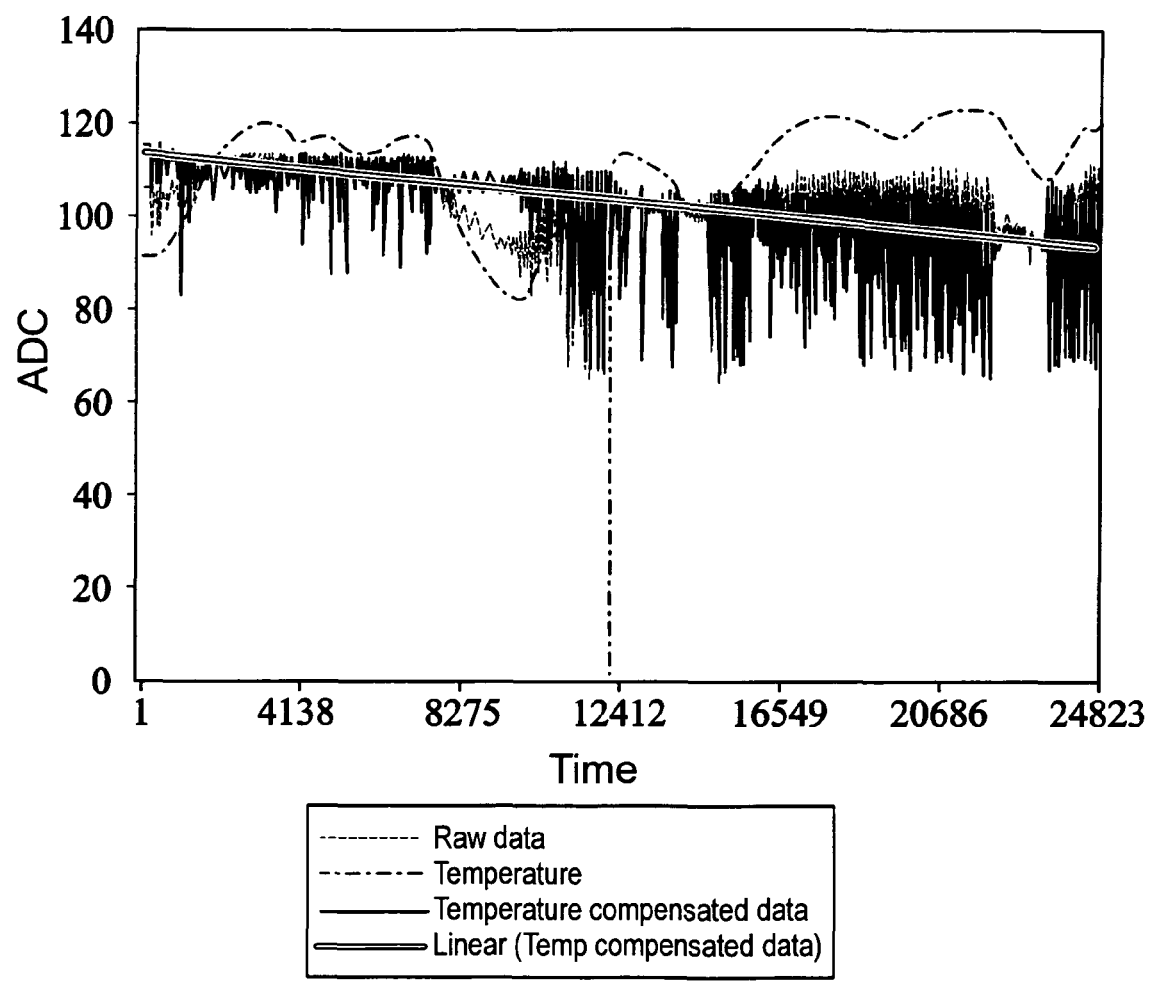
FIG. 14(a) is a graphical plot showing the effects of temperature on system fuel level readings during a driving test from a full tank to ¼ tank of fuel, with and without temperature compensation, using a linearized temperature compensation algorithm in accordance with FIG. 12(b).
Figure 14B:
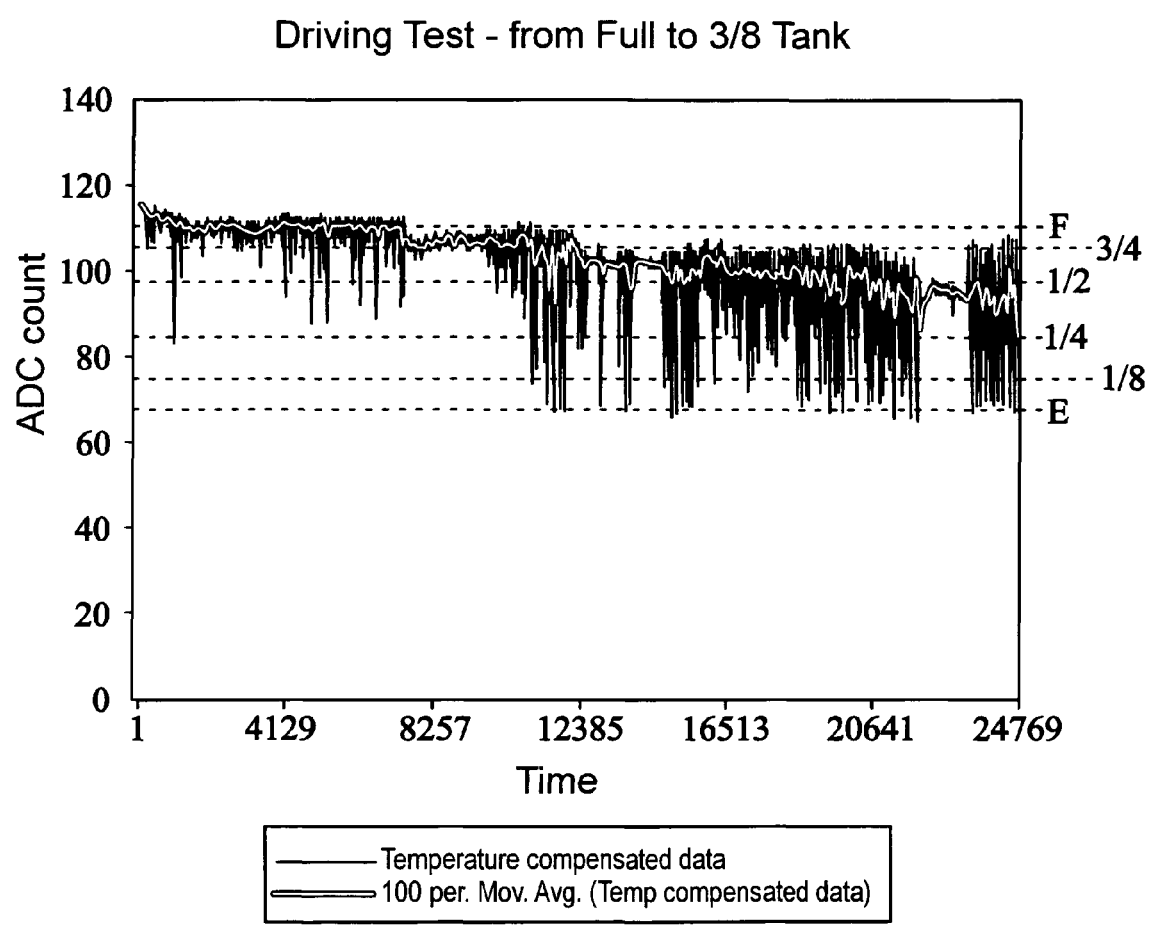
FIG. 14(b) is a graphical plot showing the effects of temperature on system fuel level readings during a driving test from a full tank to ⅜ tank using a linearized temperature compensation algorithm in accordance with FIG. 12(b).
Figure 14C:
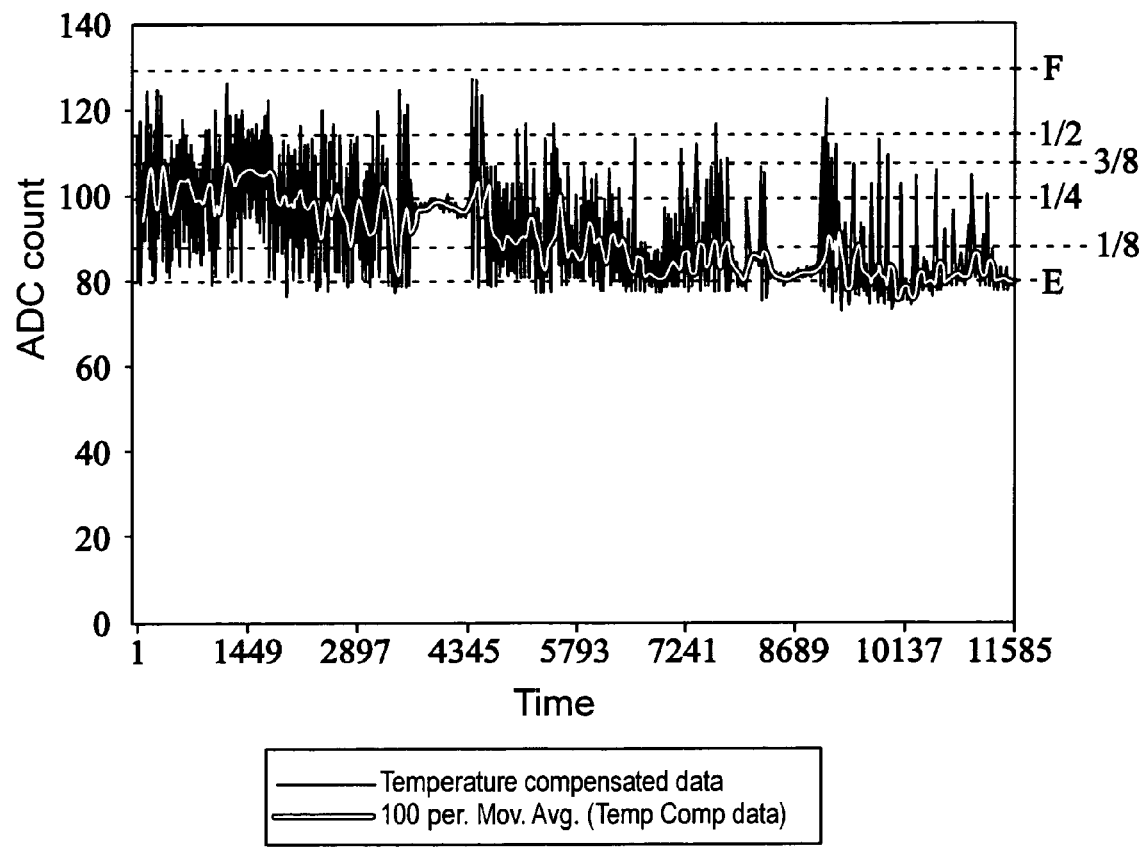
FIG. 14(c) is a graphical plot showing the effects of temperature on system fuel level readings during a driving test from a ⅜ full tank to an empty tank using a linearized temperature compensation algorithm in accordance with FIG. 12(b).

In a further test, the vehicle was driven for 230 miles starting with a full tank, stopping at regular intervals (approx. every 30 miles). The temperature, fuel level, and temperature compensated fuel level signals were recorded. The results are shown in FIGS. 14(a)-(c). The compensated fuel level signal from ADC 40 reading varies linearly from 115 to 90 when the temperature and the measured fuel level vary up and down. This demonstrates that the temperature compensation module compensates for the changes due to temperature, so that the fuel gauge always shows the real level.

The system 10 of the present invention can also be used to detect variations in the electrical properties associated with different liquids placed into the tank 15. For example, if diesel fuel is placed into a fuel tank of a vehicle that runs on gasoline (or vice-versa), this mistake can be detected upon activation of the system. Using a voltage measurement taken across a portion of the series-resonant LCR circuit, it is possible to determine the type or composition of liquid fuel in the tank due to the variation in the electrical properties of the liquid. Using the test set-up of FIG. 18, FIG. 19 shows system output profiles corresponding to the different fuel types described in the table below when placed in a fuel tank.

| NO | TITLE | FUEL RECIPE |
|---|---|---|
| 1 | MS-9368 Reformulated | Unleaded gasoline |
| 2 | MS-9368 Reformulated | Unleaded gasoline with 0.05% thiophene added |
| 3 | MS-9368 Reformulated | Unleaded gasoline with 10% by volume, ethanol, with .5% aggressive water. |
| 4 | MS-9368 Reformulated | Unleaded gasoline with 25% by volume, ethanol |
| 5 | Leaded gasoline | Indolene 30 (3 g/gal lead) |
| 6 | M25 | M25 − [75% MS8004] + [25% methanol solution consisting of: methanol (MS2585), 0.5% Aggressive water, and 0.028 ml/L Formic acid] |
| 7 | MS-9368 Reformulated | Unleaded gasoline with 20 mm water added (0.5 gal in 10 gal tank) |

Accordingly, the system 10 of the present invention can be used as a fuel composition sensor, including detecting fuel type, prior to or in addition to measuring actual fuel level. In flexible fuel vehicles which can operate with different fuel compositions (for example, E85, E10, E20), the engine control systems are preferably informed electronically of the composition of the fuel in the tank so that the necessary engine control adjustments can be made. For example, by comparing actual system output with stored output profiles associated with electrical properties of certain fuel compositions, the system of this invention can provide that functionality (along with fuel level measurement) without the added cost of conventional fuel composition sensors, such as that described in U.S. Pat. No. 6,927,583, which is incorporated herein by reference.

Figure 18:
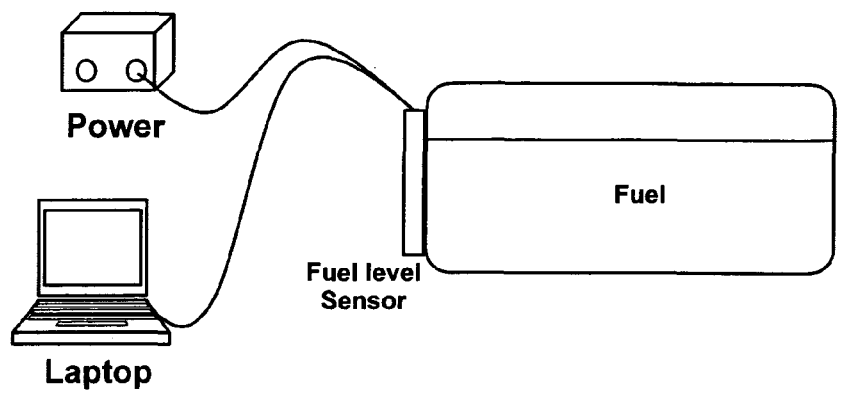
FIG. 18 is a block diagram of a test set-up used to determine the effects on system fuel level output caused by use of different fuel types in the vehicle fuel tank.
Figure 19:
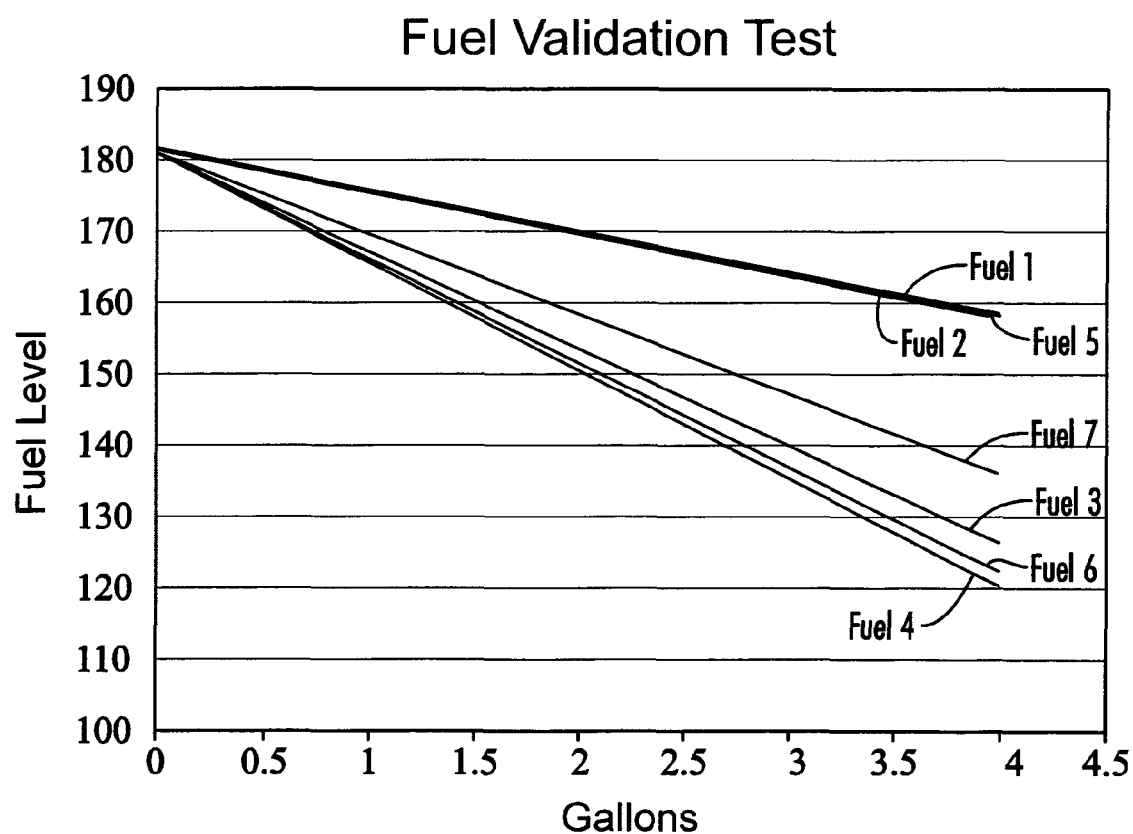
FIG. 19 is a graphical plot showing the effects on system fuel level output caused by use of different fuel types in the vehicle fuel tank.

The system output profiles determined as illustrated in the examples of FIGS. 18 and 19 can also be used to compensate the liquid level reading according to the type of liquid in the container.

Preferably, the RF generator 35 will provide RF power levels within the constraints and requirements of the FCC/ETSI regulations as appropriate.

Thus, although there have been described particular embodiments of the present invention of a new and useful System and Method for Sensing the Level and Composition of Fuel in a Fuel Tank, it is not intended that such references be construed as limitations upon the scope of this invention except as set forth in the following claims.

What is claimed is:

1. A method of sensing a property of a fuel in a fuel tank, said method comprising:
    (a) generating an RF signal at an operating frequency;
    (b) coupling the RF signal to a resonant circuit, the resonant circuit having a resonant frequency and including an inductor positioned proximate to the fuel in the fuel tank; and
    (c) measuring a change in an electrical parameter associated with the resonant circuit caused by a variation in at least one electrical property of the fuel proximate to the inductor as a function of composition of said fuel.

2. The method of claim 1, wherein step (c) comprises measuring a change in voltage at the resonant circuit.

3. The method of claim 1, wherein step (c) comprises measuring a change in the resonant frequency of the resonant circuit.

4. The method of claim 1, further comprising:
    prior to step (b), amplifying the RF signal.

5. The method of claim 1, further comprising:
    after step (c), transmitting the measured change to an external device.

6. The method of claim 1 wherein at least one additional property of the fuel in the fuel tank is volume and the measured change in the electrical parameter is a function of a variation in the volume of the fuel in the fuel tank.

7. The method of claim 6, wherein the volume of the fuel in the entire fuel tank is measured.

8. The method of claim 6, wherein the volume of the fuel in a portion of the fuel tank is measured.

9. The method of claim 6, further comprising:
    after step (c), converting the measured change to a value representing the volume of the fuel in the fuel tank.

10. The method of claim 1, further comprising:
    prior to step (a), calibrating the operating frequency of the RF signal to compensate for physical and/or electrical properties of the fuel tank.

11. The method of claim 10, wherein the operating frequency is calibrated automatically.

12. The method of claim 10, wherein the step of calibrating the operating frequency comprises:
    adjusting the operating frequency of the RF signal so that a fuel volume sensing window is defined on a substantially linear part of a frequency response curve proximate the resonant frequency of the resonant circuit.

13. The method of claim 10, wherein the step of calibrating the operating frequency comprises:

sweeping the operating frequency of the RF signal in a range between a first frequency and a second frequency; and measuring a parameter of the resonant circuit as the frequency of the RF signal is swept.

14. The method of claim 13 wherein the first frequency is approximately 7.4 MHz and the second frequency is approximately 8.3 MHz.

15. An apparatus for measuring the volume of liquid in a container comprising:
a controller mounted on a printed circuit board, the controller including an RF generator and an analog-to-digital converter (ADC);
an antenna driver having output terminals and input terminals, mounted on said printed circuit board and coupled to the RF generator; and
a resonant circuit mounted on said printed circuit board and coupled to the antenna driver and having an inductor positioned proximate the liquid in the container.

16. The apparatus of claim 15, wherein the apparatus is installed external to the container.

17. An apparatus for measuring the volume of liquid in a container comprising:
a controller, the controller including an RF generator and an analog-to-digital converter (ADC);
an antenna driver having output terminals, and input terminals, coupled to the RF generator; and
a resonant circuit coupled to the antenna driver and having an inductor positioned proximate the liquid in the container, with at least the inductor of the resonant circuit installed internal to the container.

18. An apparatus for measuring the volume of liquid in a container comprising:
a controller, the controller including an RF generator and an analog-to-digital converter (ADC);
an antenna driver having output terminals, and input terminals, coupled to the RF generator;
a resonant circuit coupled to the antenna driver and having an inductor positioned proximate the liquid in the container; and,
a ground plane positioned proximate the inductor such that the inductor is positioned between the ground plane and the container and RF energy from the inductor is directed towards a particular part of the container.

19. An apparatus for measuring the volume of liquid in a container comprising:
a controller, the controller including an RF generator and an analog-to-digital converter (ADC);
an antenna driver having output terminals, and input terminals, coupled to the RF generator;
a resonant circuit coupled to the antenna driver and having an inductor positioned proximate the liquid in the container and inside the container; and
a ground plane positioned between the inductor and the container.

20. A system for measuring a level of fuel in a non-metal fuel tank mounted in a motor vehicle, the system comprising:
a vehicle data bus;
an RF generator functional to generate an RF signal at an operating frequency;
an antenna circuit electrically coupled to the RF generator, the antenna circuit comprising a series resonant circuit and a radiating component mounted proximate to the fuel tank, the resonant circuit having a frequency response curve centered around a resonant frequency; and a controller operatively connected to the RF generator and to the antenna circuit, the controller being functional to cause the operating frequency of the RF generator to be proximate to the resonant frequency of the resonant circuit, and to measure a change in an electrical parameter associated with the resonant circuit caused by changes in the level of fuel in the fuel tank, said controller further comprising a calibration module operative to cause the operating frequency of the RF generator to be on a substantially linear portion of the frequency response curve above the resonant frequency.

21. The system of claim 20 wherein the controller is further functional to transmit the measured change in the electrical parameter.

22. The system of claim 20 wherein the controller is further functional to convert the measured change in the electrical parameter to a fuel level signal and to transmit the fuel level signal to said vehicle data bus.

23. The system of claim 20, wherein the controller further comprises a compensation module functional to adjust the fuel level signal for changes in ambient temperature.

24. The system of claim 20, wherein the controller further comprises a compensation module functional to adjust the fuel level signal for changes in electrical properties of the fuel in the tank.

25. A system for measuring a level of fuel in a non-metal fuel tank mounted in a motor vehicle, the system comprising:
a vehicle data bus;
an RF generator functional to generate an RF signal at an operating frequency;
an antenna circuit electrically coupled to the RF generator, the antenna circuit comprising a resonant circuit and a radiating component mounted proximate to the fuel tank, the resonant circuit having a frequency response curve centered around a resonant frequency;
a controller operatively connected to the RF generator and to the antenna circuit, the controller being functional to cause the operating frequency of the RF generator to be proximate to the resonant frequency of the resonant circuit, and to measure a change in an electrical parameter associated with the resonant circuit caused by changes in the level of fuel in the fuel tank; and
a ground plane mounted in the vehicle proximate the radiating component such that the radiating component is positioned between the ground plane and the fuel tank, the ground plane and radiating component electrically cooperating to direct RF energy from the radiating component to a selected region of the fuel tank.

26. A system for measuring a level of fuel in a non-metal fuel tank mounted in a motor vehicle, the system comprising:
a vehicle data bus;
an RF generator functional to generate an RF signal at an operating frequency;
an antenna circuit electrically coupled to the RF generator, the antenna circuit comprising a resonant circuit and a radiating component mounted inside the fuel tank, the resonant circuit having a frequency response curve centered around a resonant frequency;
a controller operatively connected to the RF generator and to the antenna circuit, the controller being functional to cause the operating frequency of the RF generator to be proximate to the resonant frequency of the resonant circuit, and to measure a change in an electrical parameter associated with the resonant circuit caused by changes in the level of fuel in the fuel tank; and
a ground plane positioned between the inductor and the tank.

27. A system for use in measuring a property of fuel in a vehicle fuel tank comprising:
   an RF generator functional to generate an RF signal at an operating frequency;
   an antenna circuit electrically coupled to the RF generator, the antenna circuit comprising a series resonant circuit and a radiating component mounted proximate to the fuel in the tank, the resonant circuit having a frequency response curve centered around a resonant frequency; and
   a controller operatively connected to the RF generator and to the antenna circuit, the controller being functional to cause the operating frequency of the RF generator to be proximate to the resonant frequency of the resonant circuit, to measure a change in an electrical parameter associated with the resonant circuit caused by variations in electrical properties associated with different compositions of the fuel in the tank, and to measure a change in an electrical parameter associated with the resonant circuit caused by variations in the property of the fuel in the fuel tank, said controller further comprises a calibration module operative to cause the operating frequency of the RF generator to be on a substantially linear portion of the frequency response curve above the resonant frequency.

28. The system of claim 27 wherein the property of the fuel includes fuel volume.

29. A system for use in measuring fuel composition of fuel in a vehicle fuel tank comprising:
   an RF generator functional to generate an RF signal at an operating frequency;
   an antenna circuit electrically coupled to the RF generator, the antenna circuit comprising a series resonant circuit and a radiating component mounted proximate to the fuel in the tank, the resonant circuit having a frequency response curve centered around a resonant frequency; and
   a controller operatively connected to the RF generator and to the antenna circuit, the controller being functional to cause the operating frequency of the RF generator to be proximate to the resonant frequency of the resonant circuit, to measure a change in an electrical parameter associated with the resonant circuit caused by variations in electrical properties associated with different compositions of the fuel in the tank, and to measure a change in an electrical parameter associated with the resonant circuit caused by variations in the property of the fuel in the fuel tank.

* * * * *